(12) United States Patent
Hold-Geoffroy et al.

(10) Patent No.: US 10,609,286 B2
(45) Date of Patent: Mar. 31, 2020

(54) EXTRAPOLATING LIGHTING CONDITIONS FROM A SINGLE DIGITAL IMAGE

(71) Applicant: Adobe Inc., San Jose, CA (US)

(72) Inventors: Yannick Hold-Geoffroy, Quebec (CA); Sunil S. Hadap, Dublin, CA (US); Kalyan Krishna Sunkavalli, San Jose, CA (US); Emiliano Gambaretto, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 213 days.

(21) Appl. No.: 15/621,444

(22) Filed: Jun. 13, 2017

(65) Prior Publication Data

US 2018/0359416 A1    Dec. 13, 2018

(51) Int. Cl.
| | | |
|---|---|---|
| *G06T 5/00* | (2006.01) | |
| *H04N 5/232* | (2006.01) | |
| *G06K 9/46* | (2006.01) | |
| *G06T 15/50* | (2011.01) | |
| *G06N 3/08* | (2006.01) | |
| *H04N 5/235* | (2006.01) | |
| *G06K 9/00* | (2006.01) | |
| *G06K 9/62* | (2006.01) | |
| *G06N 3/04* | (2006.01) | |

(52) U.S. Cl.
CPC ..... *H04N 5/23245* (2013.01); *G06K 9/00624* (2013.01); *G06K 9/00664* (2013.01); *G06K 9/4628* (2013.01); *G06K 9/4661* (2013.01); *G06K 9/6274* (2013.01); *G06N 3/0454* (2013.01); *G06N 3/08* (2013.01); *G06T 5/009* (2013.01); *G06T 15/506* (2013.01); *H04N 5/2351* (2013.01); *G06K 9/00671* (2013.01); *G06N 3/0481* (2013.01); *G06T 2207/20208* (2013.01); *H04N 5/23222* (2013.01)

(58) Field of Classification Search
CPC ....................................................... G06T 7/00
See application file for complete search history.

(56) References Cited

U.S. PATENT DOCUMENTS

| | | | | |
|---|---|---|---|---|
| 9,275,445 | B2 * | 3/2016 | Granados | G06T 5/009 |
| 9,448,771 | B2 * | 9/2016 | Feder | G06F 8/34 |
| 9,639,773 | B2 * | 5/2017 | Lalonde | G06K 9/4661 |

(Continued)

OTHER PUBLICATIONS

A. Banerjee, I. S. Dhillon, J. Ghosh, and S. Sra. Clustering on the unit hypersphere using von Mises-Fisher distributions. Journal of Machine Learning Research, 6:1345-1382, 2005.

(Continued)

*Primary Examiner* — Gregory M Desire
(74) *Attorney, Agent, or Firm* — Keller Jolley Preece

(57) ABSTRACT

The present disclosure is directed toward systems and methods for predicting lighting conditions. In particular, the systems and methods described herein analyze a single low-dynamic range digital image to estimate a set of high-dynamic range lighting conditions associated with the single low-dynamic range lighting digital image. Additionally, the systems and methods described herein train a convolutional neural network to extrapolate lighting conditions from a digital image. The systems and methods also augment low-dynamic range information from the single low-dynamic range digital image by using a sky model algorithm to predict high-dynamic range lighting conditions.

20 Claims, 12 Drawing Sheets

(56) References Cited

U.S. PATENT DOCUMENTS

| | | | |
|---|---|---|---|
| 10,089,960 B2* | 10/2018 | Greenebaum | G09G 5/02 |
| 10,140,690 B2* | 11/2018 | Chakraborty | B60K 35/00 |
| 2006/0103728 A1 | 5/2006 | Ishigami et al. | |
| 2006/0160608 A1 | 7/2006 | Hill et al. | |
| 2006/0274157 A1* | 12/2006 | Levien | H04N 1/2112 |
| | | | 348/220.1 |
| 2009/0175555 A1* | 7/2009 | Mahowald | H04N 5/23232 |
| | | | 382/274 |
| 2012/0155753 A1 | 6/2012 | Masato | |
| 2013/0120608 A1 | 5/2013 | Nakamura | |
| 2014/0225940 A1 | 8/2014 | Nakagawa et al. | |
| 2016/0133048 A1 | 5/2016 | Acree | |
| 2017/0195605 A1* | 7/2017 | Alves | G06K 9/4661 |
| 2018/0253865 A1 | 9/2018 | Price et al. | |
| 2018/0260975 A1 | 9/2018 | Sunkavalli et al. | |
| 2018/0359416 A1* | 12/2018 | Hold-Geoffroy | G06T 7/00 |
| 2019/0020784 A1 | 1/2019 | Otani | |
| 2019/0096046 A1* | 3/2019 | Kalantari | G06T 5/009 |

OTHER PUBLICATIONS

A. Bansal, B. Russell, and A. Gupta. Marr revisited: 2D-3D model alignment via surface normal prediction. CVPR, 2016.

J. Barron and J. Malik. Shape, illumination, and reflectance from shading. IEEE Transactions on Pattern Analysis and Machine Intelligence, 37(8):1670-1687, 2013.

J. T. Barron and J. Malik. Intrinsic scene properties from a single rgb-d image. IEEE Conference on Computer Vision and Pattern Recognition, 2013.

S. Bell, P. Upchurch, N. Snavely, and K. Bala. Material recognition in the wild with the materials in context database. IEEE Conference on Computer Vision and Pattern Recognition, 2015.

W.-t. Chu. Image2Weather : A Large-Scale Image Dataset for Weather Property Estimation, Apr. 2016.

D.-A. Clevert, T. Unterthiner, and S. Hochreiter. Fast and accurate deep network learning by exponential linear units (ELUs). In International Conference on Learning Representations, 2016.

P. Debevec. Rendering synthetic objects into real scenes: Bridging traditional and image-based graphics with global illumination and high dynamic range photography. In Proceedings of ACM SIGGRAPH, 1998.

S. Duchêne, C. Riant, G. Chaurasia, J. L. Moreno, P.-Y. Laffont, S. Popov, A. Bousseau, and G. Drettakis. Multiview intrinsic images of outdoors scenes with an application to relighting. ACM Trans. Graph., 34(5):164:1-164:16, Nov. 2015.

D. Eigen and R. Fergus. Predicting depth, surface normals and semantic labels with a common multi-scale convolutional architecture. International Conference on Computer Vision, 2015.

W.W. Esty and J. D. Banfield. The box-percentile plot. Journal of Statistical Software, 8:1-14, 2003.

S. Georgoulis, K. Rematas, T. Ritschel, M. Fritz, L. Van Gool, and T. Tuytelaars. Delight-net: Decomposing reflectance maps into specular materials and natural illumination. arXiv preprint arXiv:1603.08240, 2016.

P. R. Goode, J. Qiu, V. Yurchyshyn, J. Hickey, M.-C. Chu, E. Kolbe, C. T. Brown, and S. E. Koonin. Earthshine observations of the earth's reflectance. Geophysical Research Letters, 28(9):1671-1674, 2001.

R. Grosse, M. K. Johnson, E. H. Adelson, and W. T. Freeman. Ground truth dataset and baseline evaluations for intrinsic image algorithms. In IEEE International Conference on Computer Vision, 2009.

T. Haber, C. Fuchs, P. Bekaer, H.-P. Seidel, M. Goesele, and H. Lensch. Relighting objects from image collections. In IEEE Conference on Computer Vision and Pattern Recognition, 2009.

D. Hauagge, S. Wehrwein, P. Upchurch, K. Bala, and N. Snavely. Reasoning about photo collections using models of outdoor illumination. In British Machine Vision Conference, 2014.

D. Hoiem, A. A. Efros, and M. Hebert. Putting objects in perspective. International Journal of Computer Vision, 80(1):3-15, 2008.

L. Hošek and A. Wilkie. An analytic model for full spectral sky-dome radiance. ACM Transactions on Graphics, 31(4):1-9, 2012.

L. Hošek and A.Wilkie. Adding a solar-radiance function to the hosek-wilkie skylight model. IEEE Computer Graphics and Applications, 33(3):44-52, May 2013.

S. Ioffe and C. Szegedy. Batch normalization: Accelerating deep network training by reducing internal covariate shift. Journal of Machine Learning Research, 37, 2015.

M. T. Islam, N. Jacobs, H. Wu, and R. Souvenir. Images+Weather: Collection, validation, and refinement. In CVPR Workshop on Ground Truth, 2013.

K. Karsch, K. Sunkavalli, S. Hadap, N. Carr, H. Jin, R. Fonte, M. Sittig, and D. Forsyth. Automatic scene inference for 3D object compositing. ACM Trans. Graph., 33(3):32:1-32:15, Jun. 2014.

E. A. Khan, E. Reinhard, R.W. Fleming, and H. H. Bülthoff. Image-based material editing. ACM Transactions on Graphics, 25(3):654, 2006.

J. T. Kider, D. Knowlton, J. Newlin, Y. K. Li, and D. P. Greenberg. A framework for the experimental comparison of solar and skydome illumination. ACM Transactions on Graphics, 33(6):1-12, Nov. 2014.

D. Kingma and J. Ba. Adam: A method for stochastic optimization. In International Conference on Learning Representations, pp. 1-15, 2015.

P. Krähenbühl and V. Koltun. Efficient inference in fully connected CRFs with gaussian edge potentials. In Neural Information Processing Systems, 2012.

T. D. Kulkarni, W. F. Whitney, P. Kohli, and J. Tenenbaum. Deep convolutional inverse graphics network. In NIPS, pp. 2539-2547. 2015.

J.-F. Lalonde, L.-P. Asselin, J. Becirovski, Y. Hold-Geoffroy, M. Garon, M.-A. Gardner, and J. Zhang. The Laval HDR sky database. http://www.hdrdb.com, 2016.

J. -F. Lalonde, A. A. Efros, and S. G. Narasimhan. Estimating the natural illumination conditions from a single outdoor image. International Journal of Computer Vision, 98(2):123-145, 2012.

J.-F. Lalonde and I. Matthews. Lighting estimation in outdoor image collections. In International Conference on 3D Vision, 2014.

J.-F. Lalonde, S. G. Narasimhan, and A. A. Efros. What do the sun and the sky tell us about the camera? International Journal on Computer Vision, 88(1):24-51, May 2010.

S. Lombardi and K. Nishino. Reflectance and illumination recovery in the wild. IEEE Transactions on Pattern Analysis and Machine Intelligence, 38(1):129-141, 2016.

R. Perez, R. Seals, and J. Michalsky. All-weather model for sky luminance distribution—Preliminary configuration and validation. Solar Energy, 50(3):235-245, Mar. 1993.

A. J. Preetham, P. Shirley, and B. Smits. A practical analytic model for daylight. In Proceedings of the 26th annual conference on Computer graphics and interactive techniques—SIGGRAPH, 1999.

E. Reinhard, W. Heidrich, P. Debevec, S. Pattanaik, G.Ward, and K. Myszkowski. High Dynamic Range Imaging. Morgan Kaufmann, 2 edition, 2010, p. 538.

K. Rematas, T. Ritschel, M. Fritz, E. Gavves, and T. Tuytelaars. Deep reflectance maps. In IEEE Conference on Computer Vision and Pattern Recognition, 2016.

Q. Shan, R. Adams, B. Curless, Y. Furukawa, and S. M. Seitz. The visual turing test for scene reconstruction. In 3DV, 2015.

J. Stumpfel, A. Jones, A. Wenger, C. Tchou, T. Hawkins, and P. Debevec. Direct HDR capture of the sun and sky. In Proceedings of ACM AFRIGRAPH, 2004.

K. Sunkavalli, F. Romeiro, W. Matusik, T. Zickler, and H. Pfister. What do color changes reveal about an outdoor scene? In IEEE Conference on Computer Vision and Pattern Recognition, 2008.

Y.-H. Tsai, X. Shen, Z. Lin, K. Sunkavalli, and M.-H. Yang. Sky is not the limit: Semantic-aware sky replacement. ACM Transactions on Graphics (SIGGRAPH 2016), 35(4):149:1-149:11, Jul. 2016.

S. Wehrwein, K. Bala, and N. Snavely. Shadow detection and sun direction in photo collections. In International Conference on 3D Vision, 2015.

(56) References Cited

OTHER PUBLICATIONS

J. Xiao, K. A. Ehinger, A. Oliva, and A. Torralba. Recognizing scene viewpoint using panoramic place representation. In IEEE Conference on Computer Vision and Pattern Recognition, 2012.

Y. Zhang, J. Xiao, J. Hays, and P. Tan. Framebreak: Dramatic image extrapolation by guided shift-maps. In IEEE Conference on Computer Vision and Pattern Recognition Recognition, pp. 1171-1178, 2013.

T. Zhou, P. Krähenbühl, and A. A. Efros. Learning data driven reflectance priors for intrinsic image decomposition. In IEEE International Conference on Computer Vision, 2015.

G. Zotti, A. Wilkie, and W. Purgathofer. A Critical Review of the Preetham Skylight Model. WSCG Short Communications Proceedings I, pp. 23-30, 2007.

\* cited by examiner

EXTRAPOLATING LIGHTING CONDITIONS FROM A SINGLE DIGITAL IMAGE

BACKGROUND

When a photographer captures an image, the image is only a sample of the environment surrounding the photographer. The entire surrounding environment influences the captured image, due to factors such as shading, reflection, sun position, etc. Illumination within an image plays a critical role in the appearance of a scene. Recovering image lighting conditions is important for several digital image editing tasks including, but not limited to, image reconstruction, virtually rendering objects into an image, and digitally altering an image. In particular, when compositing objects into a digital image, an understanding of the scene lighting conditions is important to ensure that the composite is illuminated appropriately so that the composite looks realistic. In addition, scene reconstruction and modeling often requires an estimate of the lighting conditions to produce accurate geometry.

The problem of recovering image lighting conditions is an ill-posed problem complicated by scene geometry (e.g., landscape, figures, objects within the image) and material properties (e.g., albedo). These problems become even more exacerbated with outdoor scenes because of factors that cannot be controlled such as ambient lighting and atmospheric turbidity. Conventional systems attempt to solve these problems in several ways but each have various drawbacks.

For example, some conventional systems rely on extracting cues by detecting shadows and/or shading within an image. These conventional systems estimate lighting conditions of an image by performing expensive calculations associated with the shadows within the image. While these conventional systems can recover image lighting conditions with reasonable estimates of scene geometry in simple images, these conventional systems return poor results when analyzing real-world images with less predictable light sources—e.g., where overlapping shadows, a blurred or weak shadow, or else no shadow at all. Additionally, these conventional systems require taxing, time-intensive calculations.

Other conventional systems estimate low-frequency lighting conditions but rely on user input to define baseline parameters such as image geometry and material properties. These estimates are not readily available or easy to compute in most cases. Therefore, these conventional systems may produce accurate image lighting condition estimations for specific user-controlled images, but these conventional systems are incapable of accurately adapting to changing environments. For example, light sources, such as the sun, can vary in intensity depending on various factors, which causes such conventional systems to return inaccurate lighting condition estimations.

SUMMARY

One or more embodiments described herein provide benefits and solve one or more of the foregoing or other problems in the art with systems and methods for estimating lighting conditions from a single digital image using a deep learning based technique. In particular, the systems and methods described herein use a trained neural network to predict lighting conditions, including high-dynamic range lighting conditions, from a single low-dynamic range digital image. The systems and methods can also determine camera parameters associated with an image capturing device used to capture the digital image.

To train the neural network, the systems and methods fit a sky model to a set of panoramic images to identify a set of ground truth lighting parameters for each of the panoramic images. The systems and methods then extract limited field of view images from the set of panoramic images and train the neural network with the pairs of limited field of view images and ground truth lighting parameters. Once trained, the neural network allows for the recovery of lighting conditions from an input single low-dynamic range digital image. The systems and methods can then use the lighting conditions to construct a high-dynamic range sky environment map. The high-dynamic range sky environment map can then be used to modify the input digital image.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
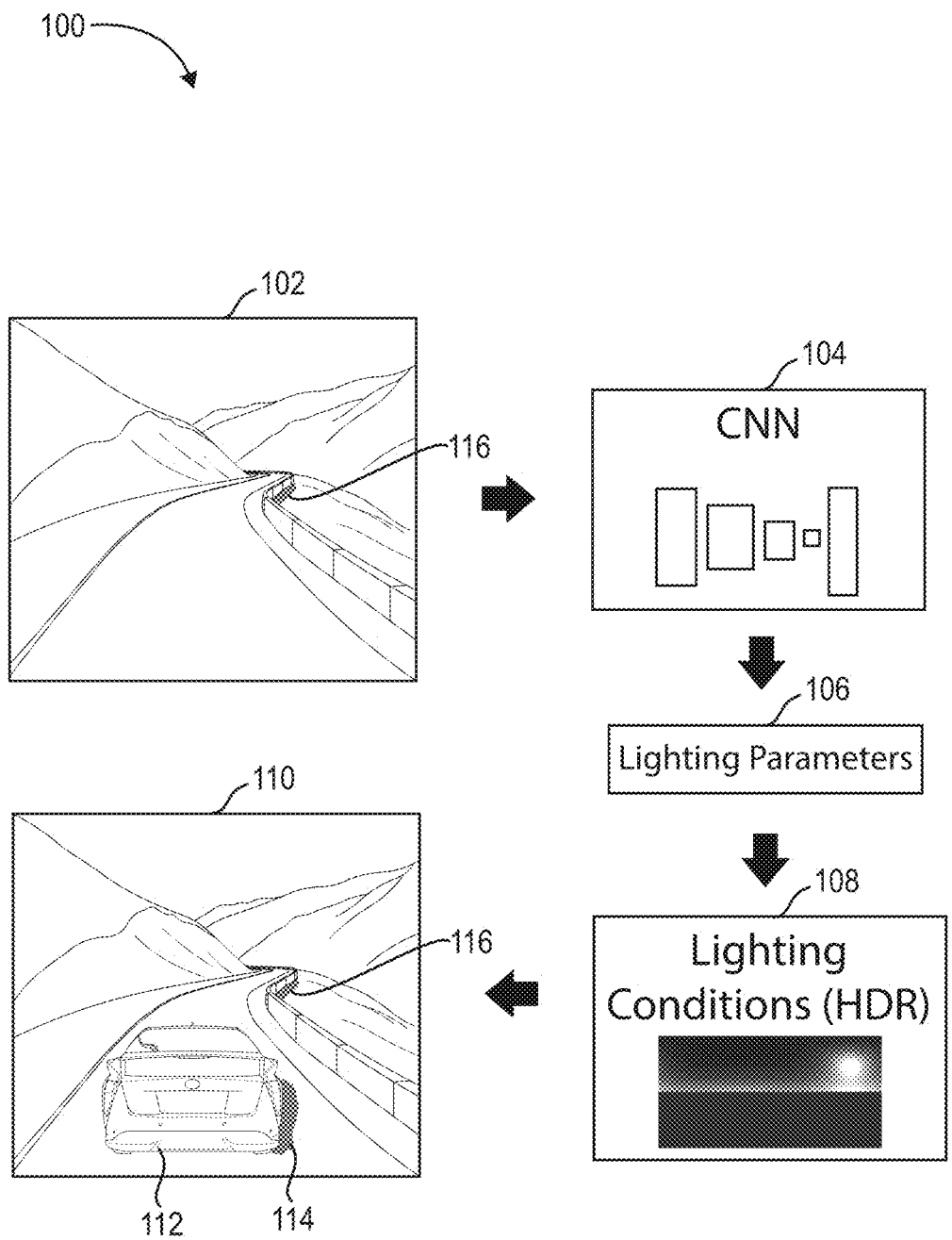
FIG. 1 illustrates an overview of a process of extracting lighting conditions from single digital image in accordance with one or more embodiments.

One or more embodiments described herein include a lighting predictor system that extracts lighting conditions from a single digital image using a deep learning based technique. In particular, the lighting predictor system described herein uses a trained neural network to predict lighting conditions, including high-dynamic range lighting conditions, from a single low-dynamic range digital image. The predicted lighting conditions allow for editing and other manipulations of digital images.

As mentioned, the lighting predictor system uses a trained neural network to extract lighting conditions from a digital image. In particular, the neural network is trained to output lighting parameters and optionally camera parameters from an input digital image. The lighting predictor system then uses the output lighting parameters to determine lighting conditions. The lighting predictor system can then use the lighting conditions to generate a modified digital image (e.g., inserting a virtual object into the digital image) or creating augmented reality.

The lighting predictor system trains the neural network using a set of panoramic images. For example, the lighting predictor system uses a set of outdoor panoramic images that include at least a portion of the sky and the sun. The lighting predictor system fits a sky model to each of the panoramic images to identify a set of ground truth lighting parameters for each of the panoramic images.

More particularly, the lighting predictor system fits parameters of a physically-based sky model to visible sky regions in given panoramic image. This allows the lighting predictor system to recover physically accurate, high-dynamic range information from the panoramic images. Furthermore, the lighting predictor system compresses the panoramic images into a compact set of physically meaningful and representative parameters that can be efficiently learned by a neural network. These lighting parameters include, for example, a sun position, atmospheric turbidity, and camera parameters.

The systems and methods then extract limited field of view images from the panoramic images and trains the neural network with the pairs of limited field of view images and ground truth lighting parameters. In particular, the lighting predictor system extracts limited field of view images (e.g., a cropped sub portion of a panoramic image) from each panoramic image. The lighting predictor system then feeds the limited field of view images into the neural network. The neural network estimates the lighting parameters of each limited field of view image and compares the estimated lighting parameters to the ground truth lighting parameters for the given panoramic image. The lighting predictor system then minimizes a loss between the estimated lighting parameters and the ground truth lighting parameters to learn how to predict the lighting parameters.

In many instances the limited field of view image will not include the sky and/or the sun. By training using limited field of view images extracted from panoramic images including the sky and/or the sun, the lighting predictor system learns to predict lighting parameters from images lacking the sky and/or the sun. Thus, the training of the neural network allows the lighting predictor system to be robust and have the ability to extract lighting conditions from arbitrary input images.

Once trained, the neural network extracts lighting parameters of an input image. The lighting predictor system then uses the extracted lighting parameters to determine lighting conditions. For example, using the sky model employed to determine the ground truth lighting parameters, the lighting predictor system constructs an environment map. As mentioned previously, the lighting conditions determined by the lighting predictor system can comprise high-dynamic range lighting conditions despite the fact that the input image is low-dynamic range.

By training and utilizing a neural network in accordance with the systems and methods described herein, the lighting predictor system produces more accurate estimations of lighting conditions. Whereas conventional systems have difficulty predicting sun position and other lighting conditions in the absence of the specific cues that they are trained for, like a visible sky or obvious shadows, the lighting predictor system described herein accurately predicts sun position and other lighting conditions in a wide range of images (e.g., images that may or may not depict the sun or sky).

As a result of generating more accurate estimations of lighting conditions, the lighting predictor system described herein further enables more accurate digital image alterations, better (e.g., more realistic) virtual object rendering, etc. For example, the lighting predictor system described herein can produce lighting conditions that can be used "as is" to photorealistically relight and render objects into images.

Furthermore, the lighting predictor system also provides faster scene illumination estimations by requiring only one low-dynamic range image rather than multiple images or even a single high-dynamic range image. In particular, the lighting predictor system analyzes fewer images than conventional systems that require multiple input images. Additionally, the lighting predictor system analyzes less complex images than conventional systems that require high-dynamic range images to estimate high-dynamic range lighting conditions. Accordingly, the lighting predictor system makes simpler calculations than conventional systems and is therefore faster. Additionally, the lighting predictor system is more easily parallelized—i.e., mapped to efficient parallel processing pipelines—for faster processing than conventional systems.

More detail regarding the lighting predictor system will now be provided with reference to the figures. In particular, FIG. 1 illustrates an overview of the lighting predictor system, in connection with an image editing system, performing a process 100 of extracting lighting conditions from an input digital image 102 and using the extracted lighting conditions to generate an output digital image 110 comprising an object rendered and illuminated according to the extracted lighting conditions.

As used herein, "lighting conditions" are the illumination properties of the environment in which a digital image was captured at the time it was captured. For example, lighting conditions can comprise an environment map that records incident light arriving from all directions at a point (e.g., the location of the camera). More particularly, lighting conditions can comprise an outdoor environment map, also referred herein as a sky environment map, that comprises a horizon line and the incident light from the sky above the horizon line. A sky environment map captures incident light arriving from the sky.

As mentioned above, the lighting predictor system, in one or more embodiments, can predict high-dynamic range lighting conditions from a single low-dynamic range image.

As used herein, "dynamic range" refers to a ratio between the brightest and darkest parts of a scene or image. High-dynamic range ("HDR") is any ratio higher than 255:1. As an example, a high-end HDR camera may have a dynamic range of 28,500:1. Additionally, the dynamic range of a real-world scene can be quite high, such as 100,000:1. As used herein, low-dynamic range ("LDR") is any ratio equal to or less than 256:1.

As shown in FIG. 1, the input to the lighting predictor system can comprise an input digital image. As used herein, the term "digital image" refers to any digital symbol, picture, icon, or illustration. For example, the term "digital image" includes digital files with the following, or other, file extensions: JPG, TIFF, BMP, PNG, RAW, or PDF. The term "digital image" also includes one or more images (e.g., frames) in a digital video. Similarly, the term "input digital image" refers to a digital image provided to the lighting predictor system for extracting lighting conditions therefrom. In one or more embodiments, an input digital image comprises a low-dynamic range image. For example, in some embodiments, input digital image 102 is a JPEG having a dynamic range of 255:1 for a total of 256 intensity levels between the brightest pixel and the darkest pixel. In other embodiments, the input digital image 102 is a digital image of another format (e.g., TIFF, GIF, BMP, etc.) having a low-dynamic range.

The input digital image 102 is provided to a trained neural network to extract the lighting conditions. As used herein, the term "neural network" refers to a machine learning model that can be tuned (e.g., trained) based on inputs to approximate unknown functions. In particular, the term "neural network" can include a model of interconnected neurons that communicate and analyze attributes at varying degrees of abstraction to learn to approximate complex functions and generate outputs based on a plurality of inputs provided to the model. For instance, the term "neural network" includes one or more machine learning algorithms. In particular, the term "neural network" includes convolutional neural networks (i.e., "CNNs"), fully convolutional neural networks (i.e., "FCNs"), or recurrent neural networks (i.e., "RCNs"). In other words, a neural network includes an algorithm that implements deep learning techniques, i.e., machine learning that utilizes a set of algorithms to attempt to model high-level abstractions in data.

FIG. 1 illustrates providing the input digital image 102 to a convolutional neural network 104. The CNN 104 is a trained neural network, as described in greater detail below, to extract lighting parameters 106 from the input digital image 102. As used herein "lighting parameters" refer to parameters that effect the lighting or illumination of a scene or image. Lighting parameters can comprise a position of the sun or other light source, sky parameters (wavelength, atmospheric turbidity (a measure of an amount of aerosols/haze/clouds in the air), and ground albedo), and camera parameters (e.g., geometric and radiometric camera calibration). Additional detail regarding the makeup, training, and functionality of the CNN 104 is provided below with reference to FIG. 4 and FIG. 5.

Upon obtaining the lighting parameters 106, the lighting predictor system uses the lighting parameters to reconstruct the lighting conditions 108 of the input digital image 102. For example, using an extracted sun position and turbidity, the lighting predictor system can construct an environment map for the input digital image 106. In one or more embodiments, the lighting conditions are HDR lighting conditions.

Given the HDR lighting conditions, an image editing system can generate a modified or output digital image 110. For example, image editing system can add objects to the output digital image 110 that are illuminated and placed based on the determined lighting and camera parameters. For example, the output digital image 110 includes a rendered car 112 illuminated according to the lighting conditions 108. In particular, the output digital image 110 includes a rendered shadow 114 based on the lighting conditions 108. Furthermore, rendered car 112 is rendered as a part of output digital image 110 according to proper shading, reflection, coloring, etc., so as to be congruous with the extrapolated lighting conditions. Similarly, the image editing system can render the car 112 using a virtual camera with the extrapolated camera parameters. This can help ensure that the car 112 is geometrically consistent with the rest of the output digital image 110.

Figure 2:
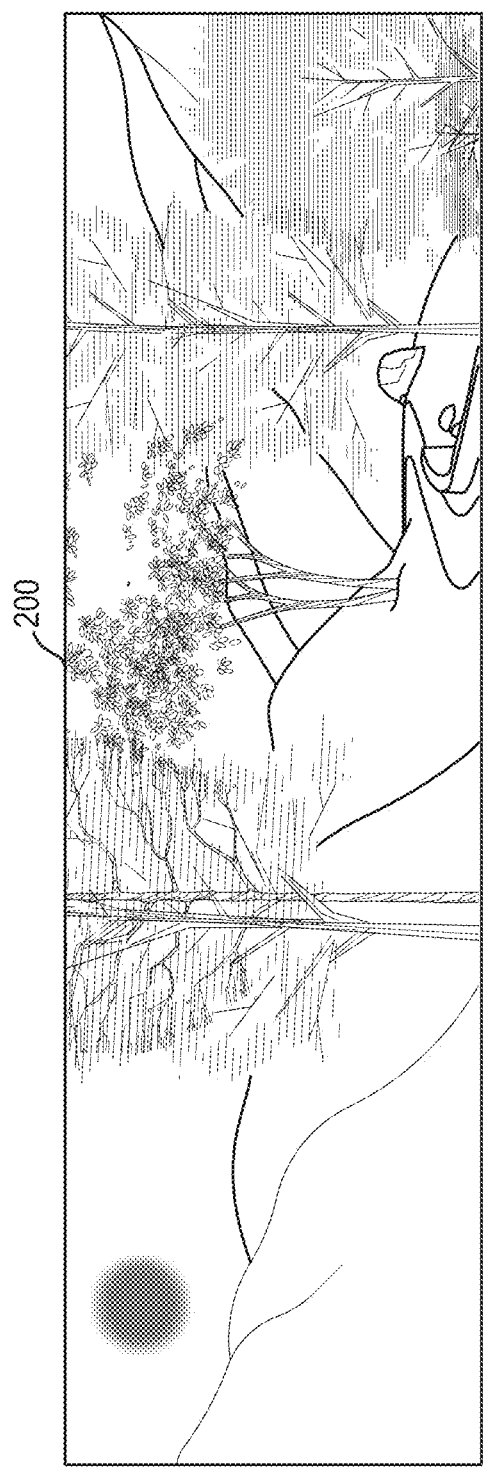
FIG. 2 illustrates a panoramic image and a limited field of view image from the panoramic image for use in training a neural network to extract lighting conditions from single digital image in accordance with one or more embodiments.

Having provided an overview of one or more embodiment of processes performed by the lighting predictor system, more detail will now be provided. In particular, referring now to FIG. 2, a panoramic image 200 is shown. As used herein, the term "panoramic image" refers to an image that has an enlarged field-of-view (e.g., horizontally, vertically, and/or diagonally). In particular, as used herein, a panoramic image portrays greater than 180 degrees of a horizontal field-of-view and/or greater than 90 degrees of a vertical field-of-view. For instance, a spherical image or 360-degree image is an example of a panoramic image. The panoramic image 200 shown in FIG. 2 is a 360-degree spherical image.

One or more embodiments employ 360-degree outdoor panoramic images because they capture scene appearance while also providing a direct view of the sun and sky, which are typically the more important sources of outdoor light. Furthermore, in one or more embodiments, the 360-degree outdoor panoramic images are LDR.

In addition to panoramic images, the lighting predictor system also uses limited-field-of-view images. As used herein, the term "limited-field-of-view image" refers to a portion (e.g., a sub-portion) of a panoramic image. In some embodiments, a limited-field-of-view image is a portion of a fully spherical 360-degree panoramic image (e.g., panoramic image 200) that has dimensions (e.g., width and height) equal to a field of view of an image capturing device. Furthermore, a limited-field-of-view image includes a limited field of view—i.e., a field of view that is less than the panoramic image from which the limited-field-of-view image is extracted. In other words, a limited-field-of-view image refers to a portion of a panoramic image that is smaller than the entirety of the panoramic image. Furthermore, a limited-field-of-view-image refers to a portion of a panoramic image having a square shape, rectangular shape, ovular shape, circular shape, or other appropriate shape.

Figure 3:
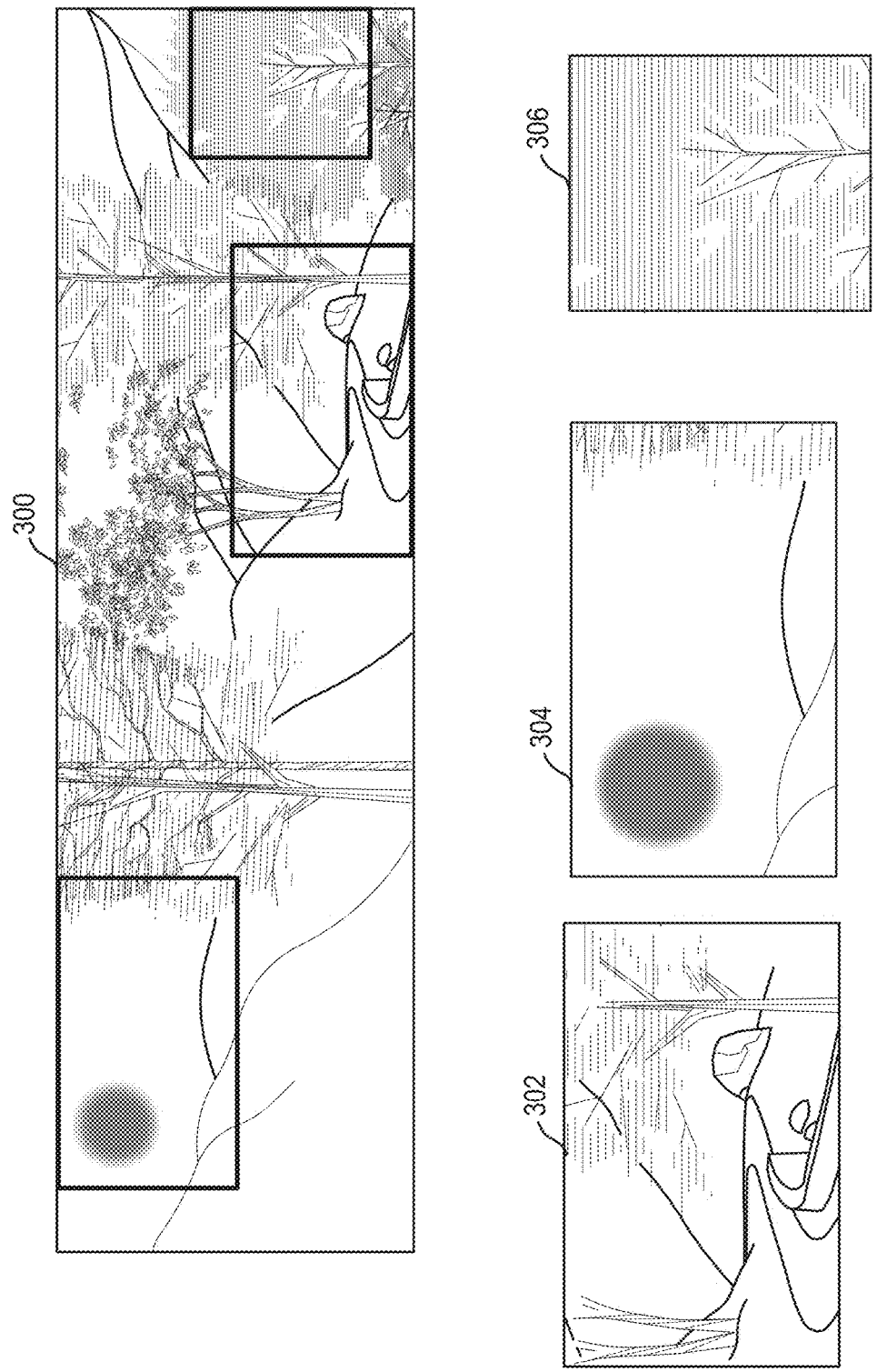
FIG. 3 illustrates the limited field of view image and panoramic image of FIG. 2 with a sun position estimated from the limited field of view image in accordance with one or more embodiments.

Referring to FIG. 3, several limited-field-of-view images 302, 304, 306 extracted from the panoramic image 200 are shown. While FIG. 3 illustrates three limited-field-of-view images extracted from the panoramic image 200, the lighting predictor system can extract more or less than three limited-field-of-view images from each panoramic image. For example, the lighting predictor system can extract four, five, six, seven or more limited-field-of-view images from each panoramic image. Alternatively, the lighting predictor system can extract a one or two limited-field-of-view images from a given panoramic image.

As shown in FIG. 3, at least some of the limited-field-of-view images 302, 306 do not include a view of the sun. Furthermore, at least some of the limited-field-of-view images 306 do not include a view of the sun or the sky.

Because such limited-field-of-view images are extracted from a panoramic image 200 including the sun and the sky, the lighting predictor system knows the sun position and the characteristics of the sky despite the lack thereof in some of the limited-field-of-view images. As explained below, this allows the lighting predictor system to have the CNN 104 learn how to predict lighting parameters from a limited-field-of-view image that lacks the sun and/or the sky.

Figure 4:
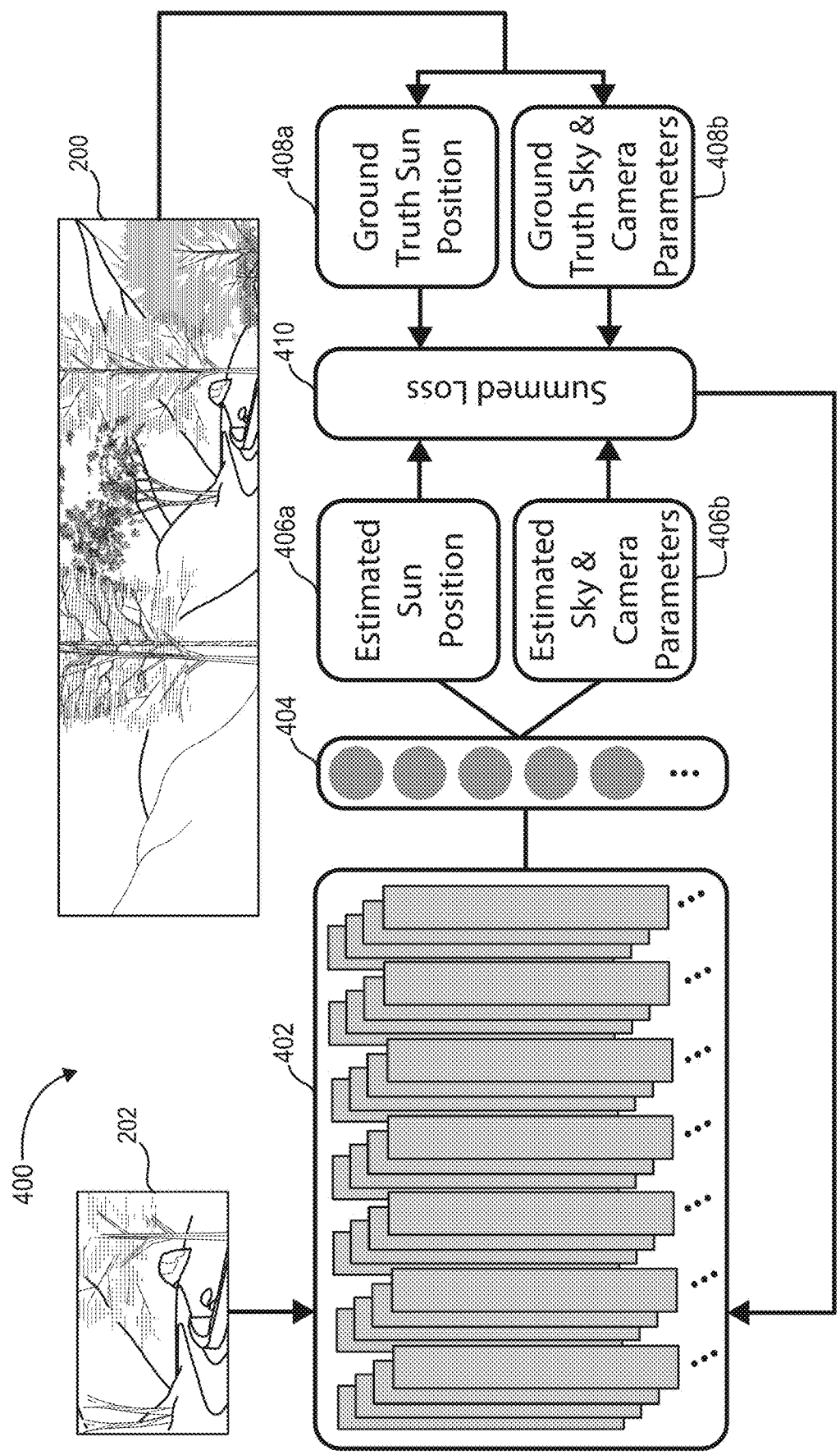
FIG. 4 illustrates an architecture for a neural network and an overview of a process for training the neural network to extract lighting conditions from single digital image in accordance with one more embodiments.

The lighting predictor system uses panoramic images and limited-field-of-view images to train the CNN 104 to extract lighting parameters from an input digital image. FIG. 4 illustrates a neural network training process 400. In particular, as shown in FIG. 4, the lighting predictor system trains a neural network to output lighting parameters from a single input image. To illustrate from FIG. 4, the lighting predictor system implements a convolutional neural network ("CNN") that includes a number of convolutional layers, a fully connected layer 404, and two heads 406a and 406b that output estimated lighting parameters such as an estimated sun position (e.g., from head 406a) and estimated sky parameters and estimated camera parameters (e.g., from head 406b).

To train the CNN to estimate lighting parameters, the lighting predictor system first determines ground truth lighting parameters (e.g., a ground truth sun position 408a and ground truth sky and camera parameters 408b) from the panoramic image 200. More particularly, the lighting predictor system uses a sky model to extract lighting parameters from the panoramic image 200 that can then be learned by the CNN. In one or more embodiments, the lighting predictor system also a sky model algorithm (e.g., such as the Hosek-Wilkie algorithm, discussed in further detail below) to analyze the panoramic image 200 to discover the ground truth lighting conditions of the panoramic scene depicted within the panoramic image 200—i.e., the same scene that includes the limited-field-of-view image 202.

In particular, the lighting predictor system segments or isolates the sky pixels $\Omega^*$ of the panoramic image 200. The lighting predictor system uses a physically-based sky model algorithm called the Hosek-Wilkie model to express spectral radiance $L_\lambda$ of a lighting direction along the sky hemisphere $l \in \Omega_{sky}$, as several parameters. The Hosek-Wilkie model, as used herein and implemented by the lighting predictor system to predict lighting conditions, is defined by:

$$L_\lambda(l) = f_{HW}(l, \lambda, t, \sigma_g, l_s) \quad \text{Equation 1:}$$

where $\lambda$ is the wavelength, t is the atmospheric turbidity, $\sigma_g$ is the ground albedo (e.g., reflectiveness of the ground), and $l_s$ is the sun position. In at least one embodiment, $\sigma_g$ is fixed to be $\sigma_g = 0.3$, which is the approximate average albedo of the Earth.

From this spectral model, the lighting predictor system calculates RGB values rendered at a discrete set of wavelengths spanning the 360-700 nm spectrum. Furthermore, the lighting predictor system converts the spectral values to CIE XYZ (i.e., the color space model as defined by the International Commission on Illumination, or the Commission Internationale de l'Elcairage) via the CIE standard observer color matching functions. The lighting predictor system again converts the color values, this time from the CIE XYZ values to CIE RGB. Referring to this conversion process (e.g., converting from spectral to CIE XYZ, and then to CIE RGB) as $f_{RGB}(\cdot)$ the RGB color $C_{RGB}(l)$ of a sky direction l can be expressed as:

$$C_{RGB} = \omega f_{RGB}(l, t, l_s) \quad \text{Equation 2:}$$

where $\omega$ is a scale factor applied to all three-color channels (e.g., red, green, and blue), aimed at estimating the exposure for each panoramic image.

The lighting predictor system determines three important parameters: the sun position $l_s$ which indicates the main directional light source of the sky, the exposure $\omega$, and the turbidity t. Turbidity is of importance in this model as it controls the relative sun color and intensity with respect to the sky. For example, low turbidity indicates a clearer sky with a brighter sun while a high turbidity indicates an overcast sky, where the sun is dimmer.

The lighting predictor system optimizes the estimation of sky model parameters from the panoramic image 200. The lighting predictor system implements a more robust method to more accurately predict lighting conditions from extremely varied conditions encountered within various panoramic images. For example, some panoramic images may severely violate the linear relationship between sky radiance and pixel values such as with, for example, unknown camera response function and white-balance, manual post-processing photographers, and the existence of stitching artifacts.

To optimize the estimate of lighting parameters, the lighting predictor system obtains sun position $l_s$, exposure $\omega$, and turbidity t by minimizing the visible sky reconstruction error in a least-squares sense. For example, given a panorama P in latitude-longitude format and a set of pixel indices $p \in S$ corresponding to sky pixels in P, the lighting predictor system utilizes the function:

$$l^*_s, \omega^*, t^* = \arg_{l_s, \omega, t} \min \Sigma_{p \in \Omega_s}(P(p)^\gamma - \omega f_{RGB}(l_p, t, l_s))^2 \quad \text{Equation 3:}$$

such that $t \in [1, 10]$, and where $f_{RGB}(\ldots)$ is defined in Equation 2 and $l_p$ is the light direction corresponding to pixel $p \in \Omega_s$ (according to latitude-longitude mapping). Here, the lighting predictor system inverses the response function of the camera with a gamma curve ($\gamma = 2.2$). In some embodiments, optimizing for $\gamma$ is unstable, and therefore in these embodiments, the lighting predictor system fixes $\gamma$ at, for example, 2.2 to yield more robust results.

In at least one embodiment, the lighting predictor system implements Equation 3 in a 2-step procedure. First, the lighting predictor system estimates the sun position $l_s$ by finding the largest connected component of the sky above a threshold (e.g., $98^{th}$ percentile), and by computing its centroid. In these or other embodiments, the lighting predictor system fixes the sun position $l_s$ at the estimated value. Second, the lighting predictor system initializes the turbidity t to $\{1, 2, 3, \ldots, 10\}$ and optimizes Equation 3 using the Trust Region Reflective algorithm (e.g., a variant of the Levenberg-Marquardt algorithm) for each of these turbidity values. The lighting predictor system keeps the parameters resulting in the lowest error as the final result. During the optimization loop for the current value of t, the lighting predictor system obtains $\omega^*$ through the closed-form solution:

$$\omega^* = \frac{\Sigma_{p \in S} P(p) f_{RGB}(l_p, t, l_s)}{\Sigma_{p \in S} f_{RGB}(l_p, t, l_s)^2} \quad \text{Equation 4}$$

The lighting predictor system also obtains the sky mask S with the sky segmentation method described in the paper, Y.-H. Tsai, X. Shen, Z. Lin, K. Sunkavalli, and M.-H. Yang. "Sky is not the limit: Semantic-aware sky replacement." *ACM Transactions on Graphics (SIGGRAPH* 2016), 35(4): 149:1-149:11, July 2016, which is incorporated herein by reference in its entirety. In particular, the lighting predictor system generates accurate sky segmentation masks by using classifiers that learn image-specific color and texture models. Furthermore, the lighting predictor system formulates a two-class conditional random field ("CRF") problem for refinement by considering neighboring pixels $x_i$ and $x_j$ with the energy E(X):

$$E(X)=\lambda_1\Sigma_i U_c(x_i)+\lambda_2\Sigma_i U_t(x_i)+\lambda_3\Sigma_i U_f(x_i)+\lambda_4\Sigma_{(i,j)\in\varepsilon} V(x_i, x_j)$$ Equation 5:

where $U_c$ and $U_t$ are color and texture unary potentials for the cost to be the sky or non-sky labels, which are obtained from a learned online classifier, and $U_f$ is a location term that accounts for the output of the neural network. In addition, V is the pairwise potential for smoothness in a set ε of adjacent pixels, and each $\lambda_1$ to $\lambda_4$ are the weights for each term. In at least one embodiment, the lighting predictor system uses equal weights from the three unary terms (e.g., $\lambda_1=\lambda_2=\lambda_3=1$), and a higher weight (e.g., $\lambda_4=100$) for the pairwise term to ensure boundary smoothness.

Additionally, the lighting predictor system performs CRF refinement using the method described in the paper, P. Krahenbuhl and V. Koltun. "Efficient interference in fully connected CRFs with Gaussian edge potentials." In *Neural Information Processing Systems*, 2015, which is incorporated by reference herein, in its entirety. In particular, the lighting predictor system performs an efficient CRF refinement on the digital images using a linear combination of Gaussian edge potentials to define appearance kernels and smoothness kernels of the digital images.

Using the foregoing algorithms, the lighting predictor system extracts a ground truth sun position, ground truth sky parameters (e.g., an exposure and a turbidity) and optionally ground truth camera parameters (elevation with respect to the horizon, azimuth, and vertical field of view) from each panoramic image.

Once the ground truth lighting parameters are obtained for the panoramic images, the lighting predictor system uses them to train the neural network. As shown in FIG. 4, in one or more embodiments, the lighting predictor system implements a convolutional neural network ("CNN"). For example, the CNN can comprise a standard forward-feed CNN that includes several convolutional layers, a fully connected layer 404, and two heads 406a, 406b (one for estimating sun position (e.g., from head 406a) and one for estimating sky parameters and camera parameters (e.g., from head 406b).

As illustrated in FIG. 4, the estimated lighting conditions can include an estimated position of the sun, an estimated atmospheric turbidity, and an estimated exposure that would cause the features (e.g., brightness, shading, etc.) that appear within the limited-field-of-view image 202. By contrast, the ground truth lighting conditions can include the actual position of the sun, the actual atmospheric turbidity, and the actual exposure of the panoramic image 200.

The lighting predictor system compares the estimated lighting conditions (e.g., as determined from the limited-field-of-view image 202) and the ground truth lighting conditions (e.g., as determined from the panoramic image 200) to determine a difference (e.g., a loss or error) between the estimated lighting conditions and the ground truth lighting conditions. By determining a difference between the estimated and ground truth lighting conditions, the lighting predictor system evaluates the accuracy of the estimations output from the CNN. To increase the accuracy of the CNN, the lighting predictor system iteratively analyzes the limited-field-of-view image 202 to decrease the loss or error between the estimated lighting conditions and the ground truth lighting conditions. In particular, as shown in FIG. 4, the lighting predictor system trains the CNN by iteratively analyzing the limited-field-of-view image 202 to more accurately estimate lighting conditions (e.g., where the estimated lighting conditions more closely resemble ground truth lighting conditions).

Particularly, the lighting predictor system compares the ground truth lighting conditions with the estimated lighting conditions to determine a summed loss 410 between the estimated sun position of head 406a and the ground truth sun position 408a as well as between the estimated sky and camera parameters of head 406b and ground truth sky and camera parameters 408b. If the lighting predictor system determines that the estimated lighting conditions and the ground truth lighting conditions are too dissimilar, the lighting predictor system reanalyzes the limited-field-of-view image 202 (e.g., re-feeds the limited-field-of-view image 202 into the CNN), using the results of the previous analysis as a bearing. Thus, the lighting predictor system trains the CNN to increase in accuracy.

To determine the summed loss 410, the lighting predictor system defines the loss to be optimized as the sum of two losses, one for each head, 406a and 406b, of the CNN:

$$\mathcal{L}_{(s^*,q^*,s,q)}=\beta\mathcal{L}_{(s^*,s)}+\mathcal{L}_{(q^*,q)}$$ Equation 6:

where, in at least one embodiment, β is fixed to be β=160 to compensate for the number of bins (e.g., 160 bins) in s. The lighting predictor system computes the target sun position s* for each bin $s_j$ as:

$$s^*_j=\exp(kl^{*T}_s l_j)$$ Equation 7:

and normalizes so that:

$$\Sigma_j s^*_j=1$$ Equation 8:

Equation 7 represents a von Mises-Fisher distribution centered about the ground truth position $l_s$. Since the lighting predictor system predicts a confident value around the sun position, the lighting predictor sets k=80 in some embodiments. The target parameters q* are simply the ground truth sky and camera parameters.

Referring to Equation 6, the lighting predictor system uses a Mean Squared Error (MSE) loss for $\mathcal{L}$ (q*, q), and the lighting predictor system further uses a Kullback-Leibler (KL) divergence loss for the sun position $\mathcal{L}$ (s*, s). The lighting predictor system uses a KL divergence to train the CNN to learn a probability distribution of potential sun positions rather than the single most likely sun position.

The lighting predictor system minimizes loss in Equation 6 via stochastic gradient descent using the "Adam optimizer" from the paper, D. Kingma and J. Ba. "Adam: A method for stochastic optimization." In *International Conference on Learning Representations*, pages 1-15, 2015, which is incorporated herein by reference in its entirety. In some embodiments, the lighting predictor system trains the CNN via implementing these algorithms on mini-batches of 128 exemplars, and further regularizes via early stopping. Accordingly, the training process (e.g., the neural network training process 400) typically converges in around 7-8 epochs since the CNN is not as deep as other modern feed-forward CNNs. Moreover, the high learning rate that the lighting predictor system uses combined with the large data set of the lighting predictor system helps in reducing the number of epochs required for training.

By using a sky model algorithm such as the Hosek-Wilkie model, the lighting predictor system profits from at least two specific benefits. First, the lighting predictor system recovers physically meaningful or physically plausible HDR information, even in saturated regions. Second, the lighting predictor system compresses the panoramic images (e.g., panoramic image 200) to a compact set of physically meaningful and representative parameters that can be efficiently learned by the CNN.

In one or more embodiments, the lighting predictor system uses sky model to generate an environment map as described above with regard to FIG. 1. For each image within data set 402, the environment map visually illustrates the lighting conditions extrapolated from the image. To generate the environment map, the lighting predictor system uses the sky model algorithm as described above (e.g., the Hosek-Wilkie model) with parameters from the CNN to create a hypothetical horizon image depicting the lighting conditions identified throughout the input image to describe the lighting conditions. More particularly, to generate a sky environment map from the Hosek-Wilkie model, the lighting predictor system discretizes the sky hemisphere $\Omega_{sky}$ into several directions (e.g., in a latitude-longitude format) and renders the RGB values with Equation 2 as defined above. In at least one embodiment, the lighting predictor system renders pixels which fall within 0.25 degrees of the sun position $l_s$ with a Hosek-Wilkie sun model and converts the calculated values to RGB as described above.

FIG. 4 of course is a simplification of the training processes as the acts described above are repeated for each pair of limited-field-of-view image and corresponding panoramic image. As mentioned above, each panoramic image can include seven limited-field-of-view images.

Figure 5:
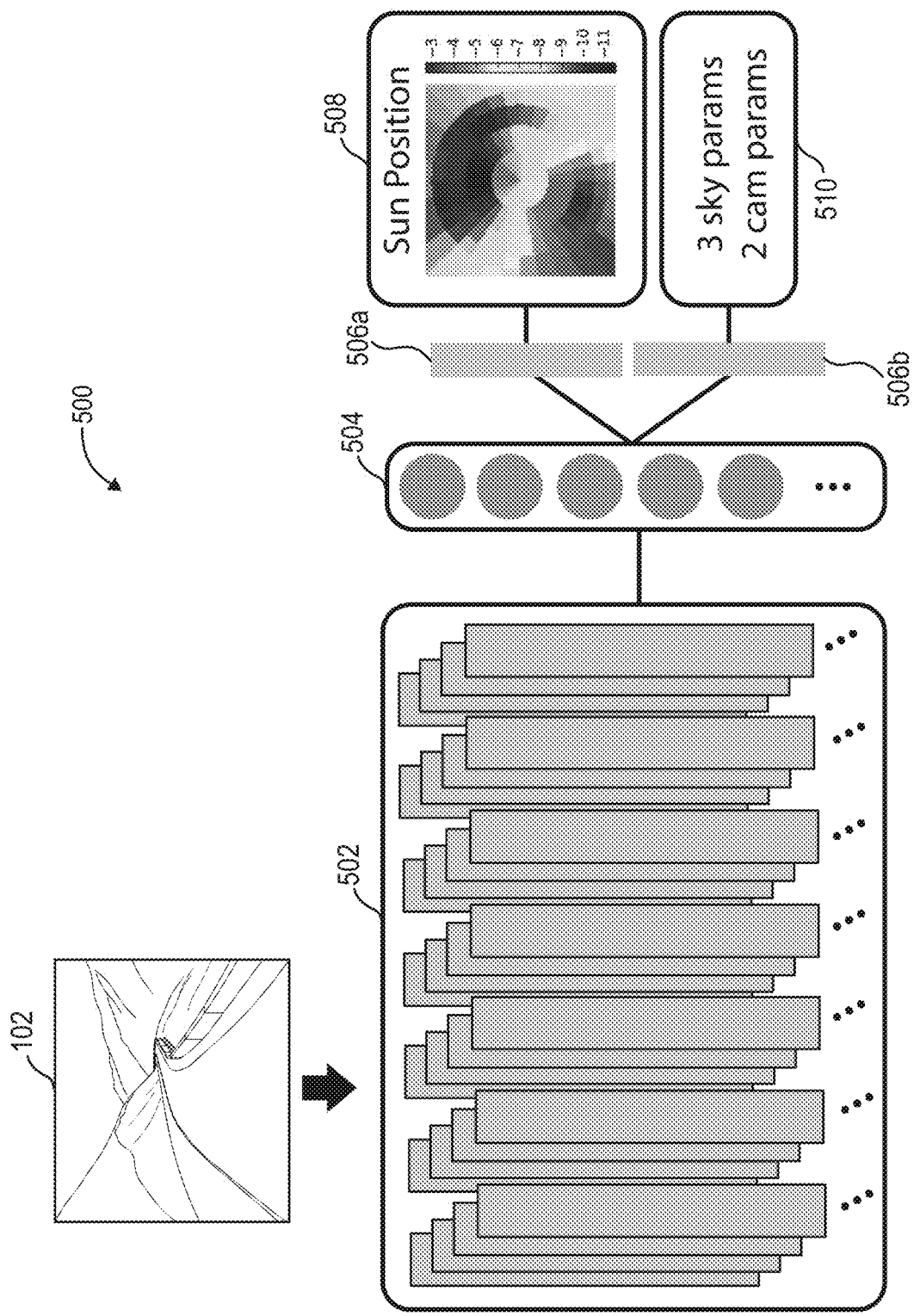
FIG. 5 illustrates an overview of feeding an input digital image to a trained neural network to extract lighting conditions from the input digital image in accordance with one more embodiments.

Once trained, the CNN can predict lighting conditions from a single input digital image. FIG. 5 illustrates an overview of process 500 of predicting lighting conditions from a single input image. As shown the process 500 includes a single LDR input image 102, convolutional layers 502, fully connected layer 504, heads 506a and 506b, a first output 508, and a second output 510. As shown in FIG. 5, the flow diagram 500 depicts a process by which the lighting predictor system generates HDR lighting conditions from a single LDR input image (e.g., input image 102).

As mentioned above, the lighting predictor system requires just a single LDR input image 102 to predict lighting conditions of the environment in which input image 202 was captured. In some embodiments, the input image 102 is an LDR image, having a dynamic range of 255:1 or lower, from the brightest pixel to the darkest pixel therein. From this input image 102, the lighting predictor system extrapolates HDR lighting conditions, estimating a more natural dynamic range of perhaps 10,000:1 or higher between lightest and darkest portions.

As shown in FIG. 5, the flow diagram includes convolutional layers 502. In particular, in at least one embodiment, the CNN includes seven convolutional layers 502. To generate appropriate parameters, the lighting predictor system uses a specific architecture for the convolutional layers 502. For example, the first convolutional layer has a filter size of 7×7, while the second convolutional layer has a filter size of 5×5. The remaining five convolutional layers use 3×3 filters. The filter banks have sizes of 64 and 128 for the first two layers and 256 for the remaining five convolutional layers. As mentioned above, every layer uses an ELU function except for the second head 506b (e.g., the sky parameters head or regression head). The lighting predictor system also performs batch normalization between each layer.

As further shown in FIG. 5, the CNN further includes one fully connected layer 504. In particular, the fully connected layer 504 contains 2048 neurons. From the fully connected layer, the CNN produces two outputs via two heads 506a and 506b.

As mentioned, the fully connected layer 504 of the CNN splits into two heads 506a and 506b. The first head 506a registers a first output 508 (e.g., vector) describing the sun position made up of 160 elements representing a probability distribution on the discretized sky hemisphere, and the second head 506b registers a second output 510 (e.g., vector) made up of five elements describing three sky parameters and two camera parameters. As described above, the Kullback-Leibler divergence is used as the loss for the first head 506a while a Euclidean norm (also called $\mathcal{L}^2$) is used for the second head 506b.

In one or more embodiments, the first head 506a (e.g., sun position head) outputs a probability distribution over the likely sun positions s by discretizing the sky hemisphere into 160 bins (5 for elevation, 32 for azimuth), and outputs a value for each of these bins. In this way, the lighting predictor system produces a probability distribution of the likely positions for the sun position. Additionally, as opposed to regressing the sun position directly (i.e., by producing a single point location of sun position), producing a probability distribution has the advantage of indicating other regions believed to be likely sun positions.

The second head 506b (e.g., parameters head) directly regresses a five-vector of parameters: three for the sky and two for the camera parameters. In some embodiments, the second head 506b regresses a four-vector of parameters q: two for the sky ($\omega$, t), and two for the camera (elevation and field of view). As will be appreciated, in at least one embodiment, each layer (other than the first output 508 and the second output 510) uses the exponential linear unit (ELU) activation function.

As will also be appreciated, the composition of the CNN is not as deep as other modern feed-forward CNNs used in vision-related technologies. Moreover, as mentioned, the high learning rate combined with the large data set (e.g., data set 402) of training data helps in reducing the number of epochs required for training the CNN.

The architecture of the CNN, including convolutional layers 502, fully connected layer 504, heads 506a and 506b, first output 508, and second output 510 can be further described by the following table.

| Layer | Stride | Resolution |
|---|---|---|
| Input | | 320 × 240 |
| Conv7-64 | 2 | 160 × 120 |
| Conv5-128 | 2 | 80 × 60 |
| Conv3-256 | 2 | 40 × 30 |
| Conv3-256 | 1 | 40 × 30 |
| Conv3-256 | 2 | 20 × 15 |
| Conv3-256 | 1 | 20 × 15 |
| Conv3-256 | 2 | 10 × 8 |
| Fully-connected layer: FC-2048 | | |

| First head: | Second head: |
|---|---|
| FC-160 | FC-5 |
| LogSoftMax | Linear |
| First output: sun position | Second output: sky and camera parameters |
| Distribution s | q |

Thus, based on the premise that similar attributes are the result of similar lighting conditions, the lighting predictor system draws conclusions of sun position, turbidity, and other lighting conditions and/or camera parameters associated with the single LDR input image. The lighting predictor system thereby determines parameter values for the lighting conditions of the single LDR input image, as described above.

The lighting predictor system, as described above, trains the CNN to learn illumination features of images. In one or more embodiments, the lighting predictor system can leverage the ability of the CNN to learn illumination to analyze, categorize, search, or otherwise process digital images. In particular, the lighting predictor system can determine a feature representation (e.g., from the fully connected layer) or a feature vector (e.g., from an earlier layer) that represents or captures illumination characteristic(s) of a digital image input to the CNN.

The lighting predictor system can then use the generated feature representation or feature vector to find images with similar lighting conditions. In particular, the lighting predictor system can determine a feature representation or feature vector of a query image and compare it to feature representations or feature vectors of other images to identify images with similar lighting conditions.

In addition, the lighting predictor system can receive labels identifying illumination characteristics (blurriness of shadows, artistic color/size of sun, etc.) of an image or a set of images. The received labels can be included as meta-data with the image(s). The lighting predictor system can analyze a set of additional images to identify images that have similar illumination characteristics by comparing a generated feature representation or feature vector of a labeled image with feature representations or feature vectors of unlabeled images. Upon identifying unlabeled images with feature representations or feature vectors that match or are within a threshold value, the lighting predictor system can attach metadata to those similar images to label them as having the particular illumination characteristic(s).

Figure 6A:
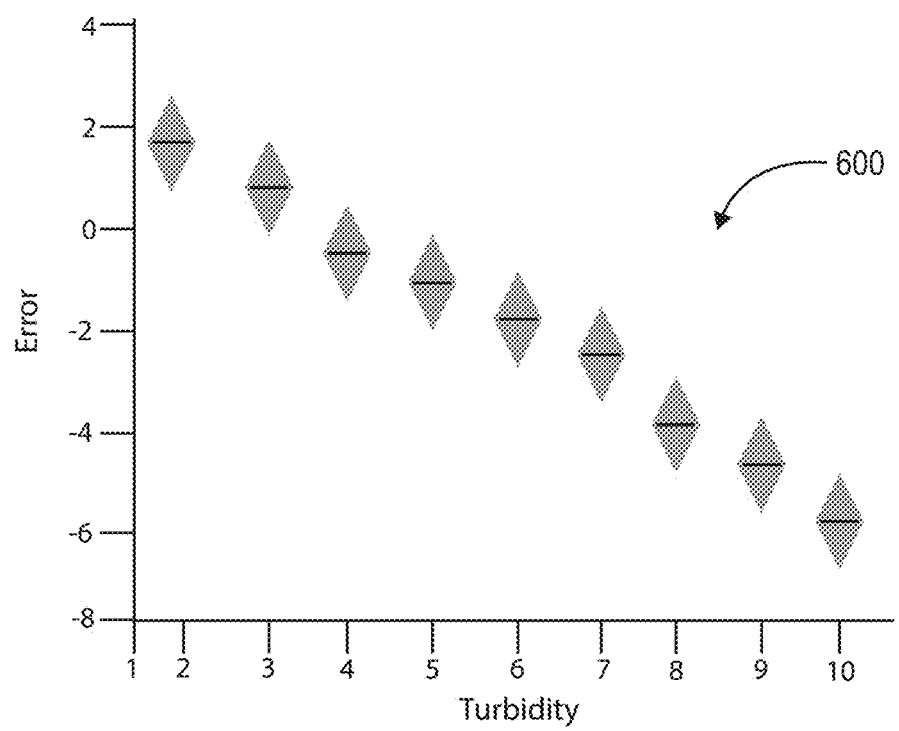
FIGS. 6A and 6B illustrate performance graphs for estimating lighting conditions by a lighting predictor system in accordance with one or more embodiments.
Figure 6B:
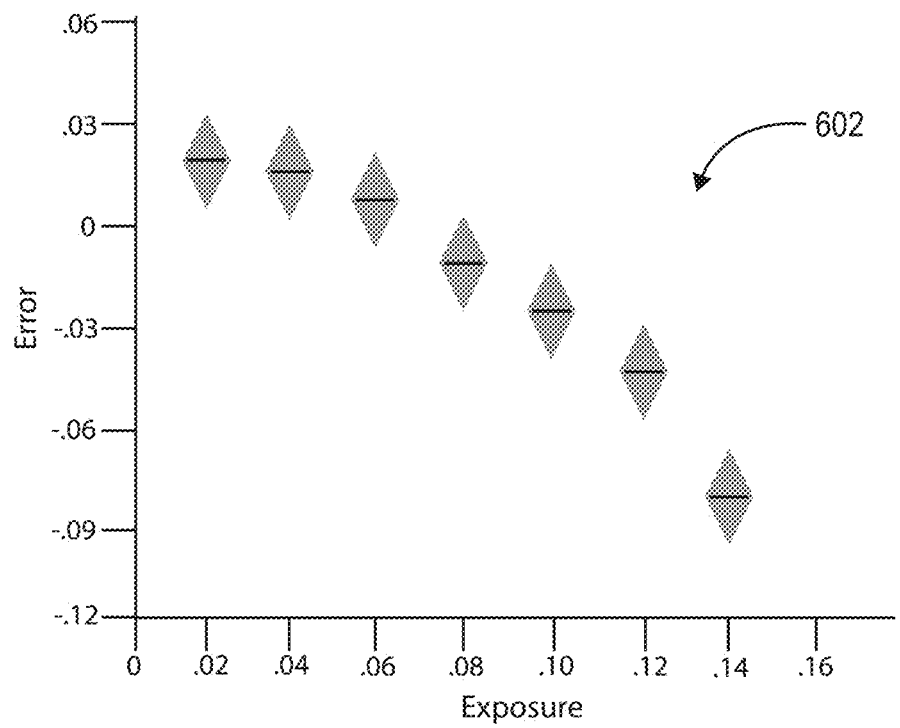

Looking now to FIG. 6A and FIG. 6B, graphs 600 and 602 depict error plots of the lighting predictor model for estimating turbidity and exposure, respectively. In particular, FIG. 6A illustrates graph 600 depicting a quantitative evaluation for turbidity t including box-percentile plots where the envelope (e.g., gray portion) of each bin represents the percentile and the horizontal bar represents the median. Evaluating the regression performance of the lighting predictor system, FIG. 6A shows the error box-percentile plots when sampling a SUN360 test set. Overall, the lighting predictor system favors low turbidity but nonetheless exhibits superior results as compared to conventional systems.

FIG. 6B illustrates graph 602 depicting box-percentile plots for exposure estimation. In particular, the graph 602 illustrates that the lighting predictor system successfully eliminates low exposure values. Accordingly, graph 602 shows that the lighting predictor system exhibits good performance in estimating exposure values.

Furthermore, the lighting predictor system provides accurate estimations of camera parameters (e.g., elevation and field of view) as well. For example, in one or more embodiments, the lighting predictor system achieves an error of less than 7 degrees for elevation and less than 11 degrees for field of view over 80 percent of the test images, indicating very strong results.

Figure 7A:
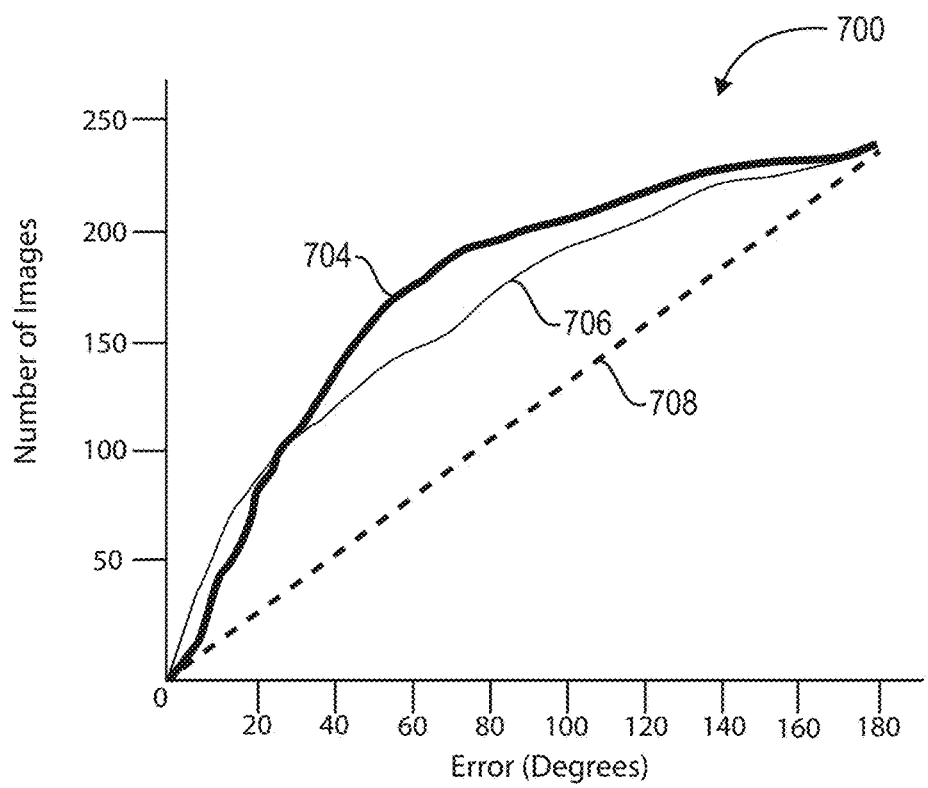
FIGS. 7A and 7B illustrate performance graphs of the lighting predictor system compared to a conventional system in accordance with one or more embodiments.
Figure 7B:
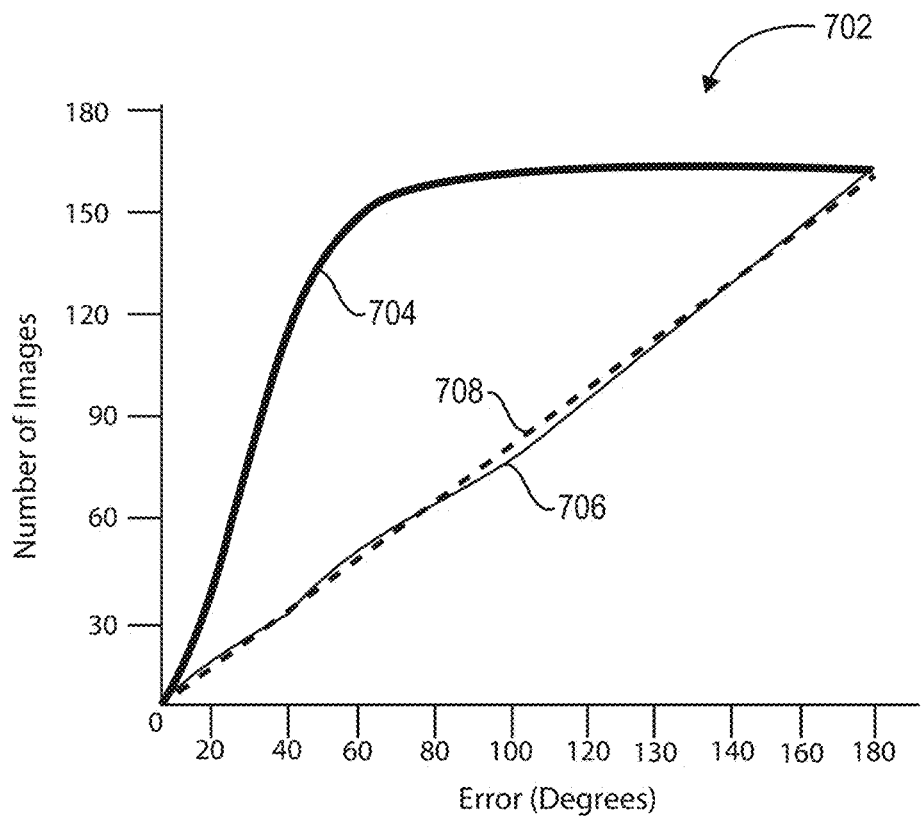

Looking now to FIG. 7A and FIG. 7B, a comparison of the lighting predictor system and a conventional system is shown. In particular, FIG. 7A and FIG. 7B illustrate graphs 700 and 702, each including three plot lines (e.g., plot lines 704, 706, and 708). FIG. 7A and FIG. 7B also illustrate graphs 700 and 702, each with an x-axis labeled as error (in degrees) and with a y-axis labeled in a number of images. Accordingly, graphs 700 and 702 show a number of test images that are within a certain error, as tested by the lighting predictor system described herein or as tested by a conventional system. Thus, it will be appreciated that curves (e.g., plot lines) which are more logarithmic in appearance (e.g., curves that rise steeply to an asymptote) represent systems that yield superior results.

As illustrated in FIG. 7A, graph 700 depicts the performance of the lighting predictor system described herein as well as the performance of a conventional system when sampling images from the dataset used by the conventional system. As shown, plot line 704 represents the performance of the lighting predictor system described herein while plot line 706 represents the performance of a conventional system (e.g., the system proposed by Lalonde et al.). Additionally, plot line 708 represents a baseline error line for illustrative purposes. As shown in FIG. 7A, plot line 704 (representing the lighting predictor system described herein) has comparable performance to plot line 706 (representing the conventional system of Lalonde et al.) within a low degree of error. However, as the error increases along the x-axis, plot line 704 shows superior performance in that a larger number of images are analyzed while remaining within the same error as plot line 706. Thus, even using the custom dataset organized by Lalonde et al., the lighting predictor system described herein nonetheless outperforms the conventional system.

As illustrated in FIG. 7B, graph 702 depicts the performance of the lighting predictor system described herein as well as the same conventional system (e.g., Lalonde et al.) when sampling a 176-image subset of the SUN360 dataset. It will be appreciated that the SUN360 dataset contains much more complex and more challenging images than the dataset used by Lalonde illustrated in FIG. 7A. As can be seen in FIG. 7B, plot line 704 shows vastly superior performance to plot line 706. In particular, plot line 706 (representing the Lalonde et al. system) has collapsed onto plot line 708, thereby illustrating that the conventional system exhibits poor performance over a more complicated set of images. By contrast, plot line 704 depicts superior performance exhibited by the lighting predictor system described herein. In particular, plot line 704 shows a low degree of error over a relatively high number of images, even over a more challenging dataset such as SUN360.

Figure 8:
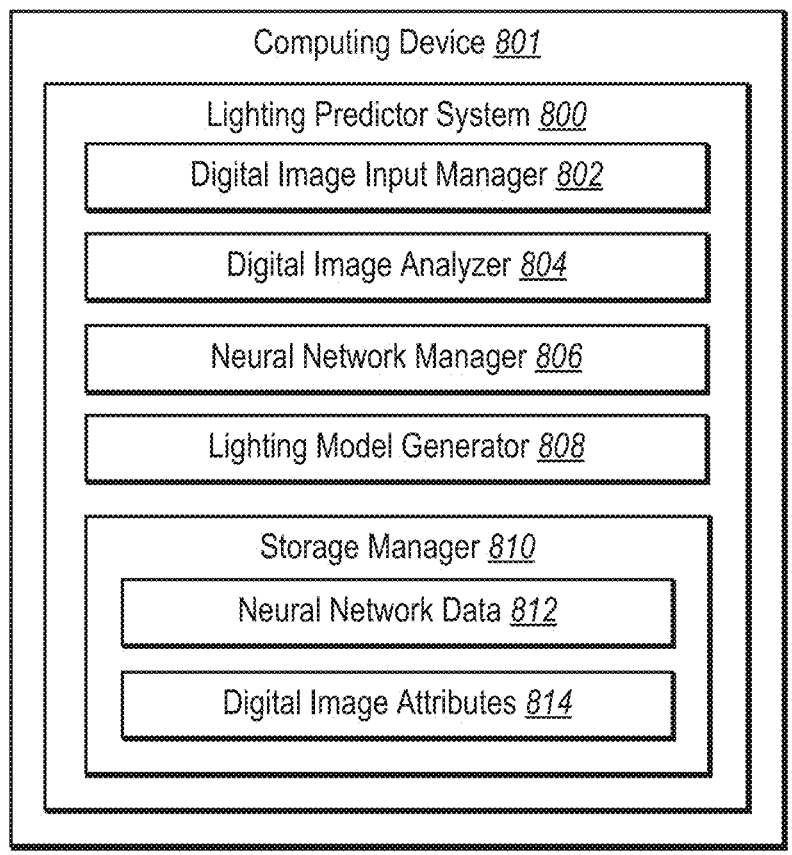
FIG. 8 illustrates an example architecture of a lighting predictor system in accordance with one or more embodiments.

Looking now to FIG. 8, additional detail is provided regarding components and capabilities of one embodiment of the lighting predictor system. In particular, FIG. 8 illustrates an embodiment of an exemplary lighting predictor system 800 (e.g., the lighting predictor system referenced and described above). As shown, the lighting predictor system 800 may include, but is not limited to, a digital image input manager 802, a digital image analyzer 804, a neural network manager 806, a lighting model generator 808, and a storage manager 810.

As just mentioned, and as illustrated in FIG. 8, the lighting predictor system 800 includes a digital image input manager 802. The digital image input manager 802 can manage input images such as the single LDR input image 102 of FIG. 1. In particular, the digital image input manager 802 can receive digital images and communicate with the digital image analyzer 804 to analyze the digital image. The digital image input manager 802 receives input images as well as training images (e.g., data set 402) to train the CNN within the lighting predictor system. In some embodiments, the digital image input manager 802 receives thousands of images, including fully spherical 360-degree panoramic views of the outdoors.

As shown in FIG. 8, the lighting predictor system 800 further includes a digital image analyzer 804. The digital image analyzer 804 can communicate with the digital image input manager 802 to receive a digital image to analyze. In particular, the digital image analyzer 804 analyzes input images (e.g., input image 102) as well as training images (e.g., data set 402). When analyzing training images, the digital image analyzer 804 communicates with the neural network manager 806 to train a CNN to extrapolate image lighting conditions.

Additionally, the lighting predictor system 800 includes a neural network manager 806. The neural network manager 806 can manage a CNN by communicating with the digital image input manager 802, the digital image analyzer 804, and/or the lighting model generator 808 to train the CNN to extrapolate lighting conditions from a single input image. In particular, the neural network manager 806 receives image training data from the digital image analyzer 804 to train the CNN to associate certain lighting conditions.

Illustrated in FIG. 8, the lighting predictor system 800 further includes a lighting model generator 808. The lighting model generator 808 can generate an HDR environment map from extrapolated lighting conditions. In particular, the lighting model generator 808 can communicate with the neural network manager 806 to receive lighting condition information. In some embodiments, where the lighting condition information is from an LDR input image, the lighting model generator 808 applies a physically-based lighting model algorithm to estimate HDR lighting conditions associated with the single LDR input image. In these or other embodiments, the lighting model generator 808 generates a model to describe the lighting conditions and camera parameters associated with the input image.

The lighting predictor system 800 also includes the storage manager 810. The storage manager 810 maintains data to perform the functions of the lighting predictor system 800. Thus, the storage manager 810 can comprise memory as described below. As illustrated, the storage manager 810 includes neural network data 812 and digital image attributes 814. For example, the neural network data 812 includes data necessary for the neural network manager 806 such as training data, learned associations between image attributes (e.g., digital image attributes 814) and hypothetical lighting conditions that would cause such attributes, etc. Additionally, digital image attributes 814 can be, for example, brightness, shadow location, shadow color, shadow length, shadow direction, shading, luminance, pixel values, colors, etc. that digital image analyzer 804 identifies and stores.

Each of the components 802-814 of the lighting predictor system 800 and their corresponding elements (e.g., as shown in FIG. 8) may be in communication with one another using any suitable communication technology. It will be recognized that although components 802-814 of the lighting predictor system 800 and their corresponding elements are shown to be separate in FIG. 8, any of components 802-814 and their corresponding elements may be combined into fewer components, such as into a single facility or module, divided into more components, or configured into different components as may serve a particular embodiment.

The components 802-814 of the lighting predictor system 800 and their corresponding elements can comprise software, hardware, or both. For example, the components 802-814 and their corresponding elements can comprise one or more instructions stored on a computer-readable storage medium and executable by processors of one or more computing devices 801. When executed by the one or more processors, the computer-executable instructions of the lighting predictor system 800 can cause a client device and/or a server device to perform the methods described herein. Alternatively, the components 802-814 and their corresponding elements can comprise hardware, such as a special purpose processing device to perform a certain function or group of functions. Additionally, the components 802-814 and their corresponding elements can comprise a combination of computer-executable instructions and hardware.

Furthermore, the components 802-814 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-814 may be implemented as a standalone application, such as a desktop or mobile application. Furthermore, the components 802-814 may be implemented as one or more web-based applications hosted on a remote server. The components 802-814 may also be implemented in a suite of mobile device applications.

Figure 9:
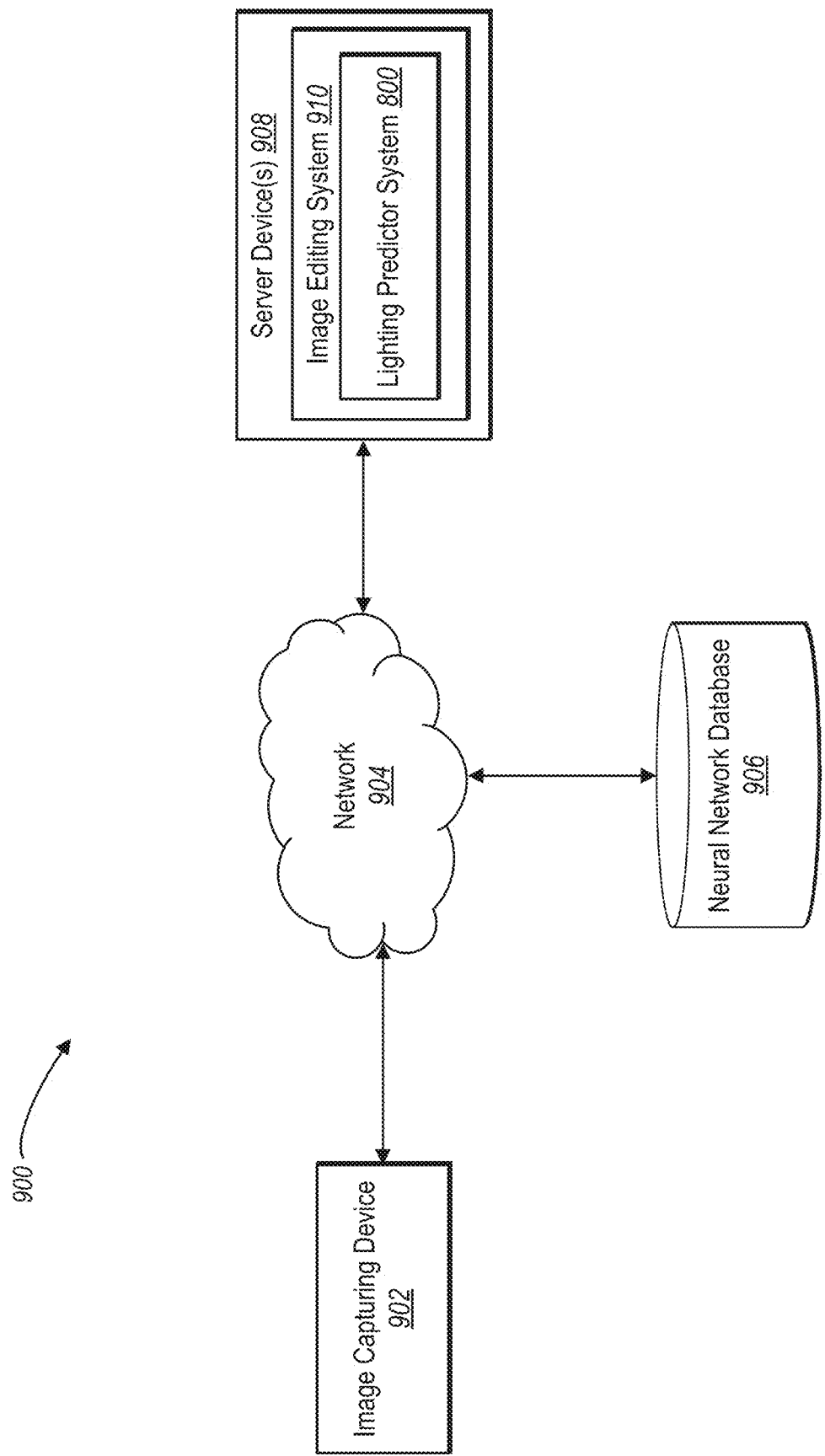
FIG. 9 illustrates an example environment in which the lighting predictor system operates in accordance with one or more embodiments.

FIG. 9 illustrates a schematic diagram of one embodiment of an exemplary environment 900 in which the lighting predictor system (e.g., the lighting predictor system 800) operates. In one or more embodiments, the exemplary environment 900 includes an image capturing device 902, a network 904, a neural network database 906, and one or more server device(s) 908. The lighting predictor system 800 can form part of a large software suite, such as an image editing system 910.

As illustrated in FIG. 9, the environment 900 may include an image capturing device 902. Image capturing device 902 may include a camera, a smartphone, a tablet, or other device—mobile or non-mobile—with image capturing capabilities. For example, image capturing device 902 may communicate with server device(s) 908 via network 904 to transfer (e.g., upload) one or more captured digital images, whereupon the lighting predictor system 800 may analyze the uploaded image to extrapolate lighting conditions associated thereto, as described in further detail above.

As also illustrated in FIG. 9, the environment 900 may further include a neural network database 906. In one or more embodiments, the neural network database 906 may communicate with the image capturing device 902 and/or the lighting predictor system 800 at server device(s) 908 to store neural network training data (e.g. information or data associated with data set 402), image attributes, lighting condition data, etc. For example, the neural network database 906 may comprise memory to store neural network information as described above. While the environment 900 illustrates the neural network database 906 as an independent entity separate from server device(s) 908, it will be appreciated that, in some embodiments, the neural network database 906 may be integrated with (e.g., a part of or located at) the server device(s) 908.

Additionally, the environment may further include one or more server device(s) 910. The server device(s) 908 can include all or a portion of the lighting predictor system 800. In particular, the lighting predictor system 800 can comprise an application running on the server device(s) 908 or a portion of a software application that can be downloaded from the server device(s) 908. For example, the lighting predictor system 800 can include a web hosting application that allows the image capturing device 902 to interact with digital image data at neural network database 906 and/or lighting predictor system data at the server device(s) 908. To illustrate, in one or more embodiments of the exemplary environment 900, the server device(s) 908 can access digital image information and/or CNN training data associated with digital images stored in the neural network database 906 and/or received from the image capturing device 902.

Although FIG. 9 illustrates a particular arrangement of the image capturing device 902, the network 904, the neural network database 906, and the server device(s) 908, various additional arrangements are possible. For example, while FIG. 9 illustrates a single image capturing device 902 communicating with a neural network database 906 and server device(s) 908 via the network 904, in one or more embodiments multiple image capturing devices may communicate directly with the server device(s) 908 and the neural network database 906, bypassing network 904.

Similarly, although the environment 900 of FIG. 9 is depicted as having various components, the environment 900 may have additional or alternative components. For example, the lighting predictor system can be implemented on a single computing device. In particular, the lighting predictor system may be implemented in whole by a user device (e.g., an image capturing device, a mobile device, a computer, etc.), or else the lighting predictor system may be implemented in whole by the server device(s) 908. Alternatively, the lighting predictor system may be implemented across multiple devices or components.

By way of example, in one or more embodiments, server device(s) 908 initiate a lighting prediction process (e.g., the process 100 illustrated in FIG. 1). The server device(s) 908 can generate a set of HDR lighting conditions associated with an input image by way of the CNN and sky model or variation thereof as described above. For example, the server device(s) 908 can utilize the digital image input manager 802, the digital image analyzer 804, the neural network manager 806, and the lighting model generator 808 alone or in conjunction with an image capturing device (e.g., image capturing device 902). Furthermore, the server device(s) 908 can communicate with the neural network database 906 to request access to data necessary for the CNN to extrapolate lighting conditions from an input image. In response, the neural network database 906 can provide metadata, lighting condition data, CNN training data, and/or other relevant information to the server device(s) 908 by way of network 904.

Figure 10:
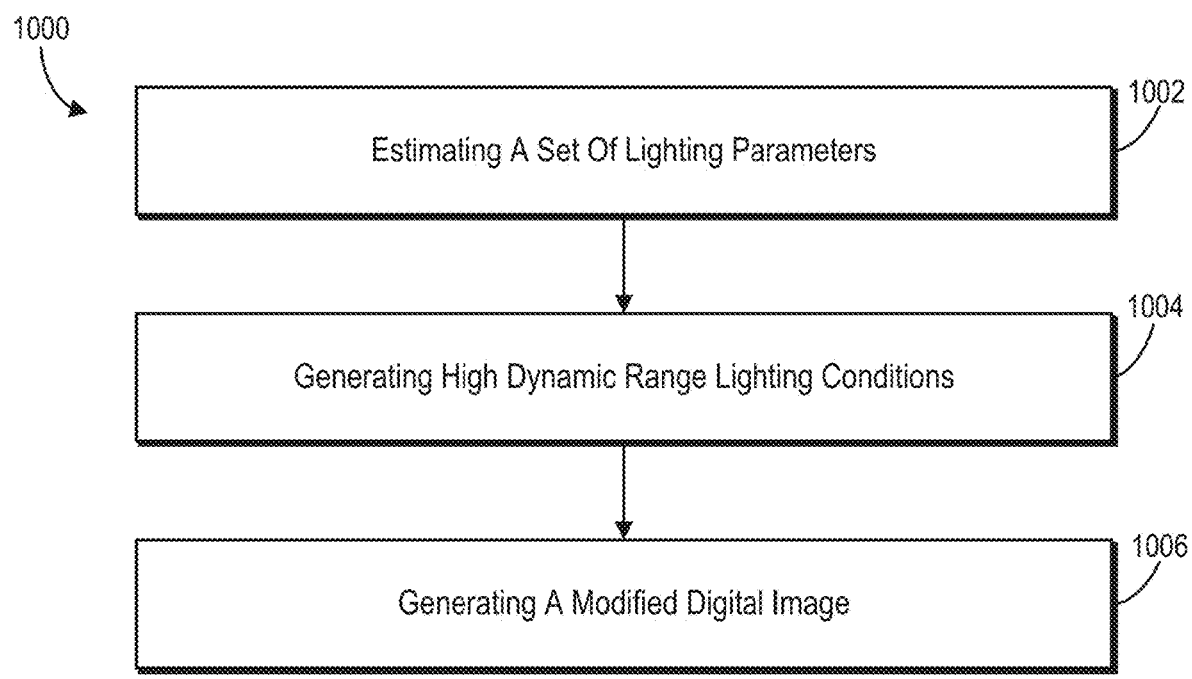
FIG. 10 illustrates a flowchart of a series of acts in a method for predicting lighting conditions in accordance with one or more embodiments.

FIG. 1-9, the corresponding text, and the examples provide several different systems and methods that predict lighting conditions. In addition to the foregoing, embodiments can also be described in terms of flowcharts comprising acts and/or steps in a method for accomplishing a result. For example, FIG. 10 illustrates a flowchart of an exemplary method in accordance with one or more embodiments. The method described in relation to FIG. 10 may be performed with fewer or more steps/acts or the steps/acts may be performed in any number of different orders or sequences. Additionally, the steps/acts described herein may be repeated or performed in parallel with one another or in parallel with different instances of the same or other similar steps/acts.

FIG. 10 illustrates a flowchart of a series of acts in a method 1000 of lighting condition prediction. In one or more embodiments, the method 1000 is performed in a digital medium environment for performing one or more of training a CNN to learn to extrapolate HDR lighting conditions or estimating HDR lighting conditions from a single LDR input image (e.g., performed by software running on one or more computing devices). The method 1000 is intended to be illustrative of one or more methods in accordance with the present disclosure, and is not intended to limit potential embodiments. Alternative embodiments can include additional, fewer, or different steps than those articulated herein with respect to FIG. 10.

As illustrated in FIG. 10, the method 1000 includes an act 1002 of estimating a set of lighting parameters. In particular, the act 1002 can include estimating a set of lighting parameters from a single low-dynamic range digital image by feeding the single low-dynamic range digital image into a neural network trained using a plurality of pairs of panoramic images and limited-field-of-view images to output lighting parameters from a single input image. Additionally, the act 1002 can include estimating a sun position for the single low-dynamic range digital image. In at least one embodiment, the single low-dynamic range digital image is devoid (e.g., does not include, did not capture, etc.) of a captured (e.g., pictured, photographed, etc.) sun or a captured sky.

In at least one embodiment, the act 1002 can include generating a probability distribution over likely sun positions. Additionally, the act 1002 can include estimating an atmospheric turbidity and an exposure.

In addition, the method 1000 of FIG. 10 includes an act 1004 of generating high-dynamic range lighting conditions. In particular, the act 1004 can include generating, based on the set of lighting parameters, high-dynamic range lighting conditions for the single low-dynamic range digital image. Additionally, the act 1004 can include generating a high-dynamic range outdoor environment map. The act 1004 can further include inserting an object into the single low-dynamic range digital image, the object being illuminated according to the generated high-dynamic range lighting conditions.

The method 1000 further includes an act 1006 of generating a modified digital image. In particular, the act 1006 can include generating a modified digital image from the single low-dynamic range digital image using the generated high-dynamic range lighting conditions.

Additionally, the method 1000 can include an act of estimating, using the neural network and from the single low-dynamic range digital image, one or more camera parameters associated with an image capturing device used to capture the single low-dynamic range digital image.

In at least one embodiment, the method 1000 further includes an act of analyzing a set of low-dynamic range panoramic images to determine a plurality of ground truth lighting parameters. In addition, the method 1000 can include an act of feeding into the neural network a limited-field-of-view portion of each low-dynamic range panoramic image to estimate lighting parameters for each limited view portion and an act of comparing, for each low-dynamic range panoramic image, the ground truth lighting parameters with the estimated lighting parameters of the corresponding limited-field-of-view portion. Furthermore, the method 1000 can also include an act of minimizing a loss between the estimated lighting parameters and the ground truth lighting parameters.

Figure 11:
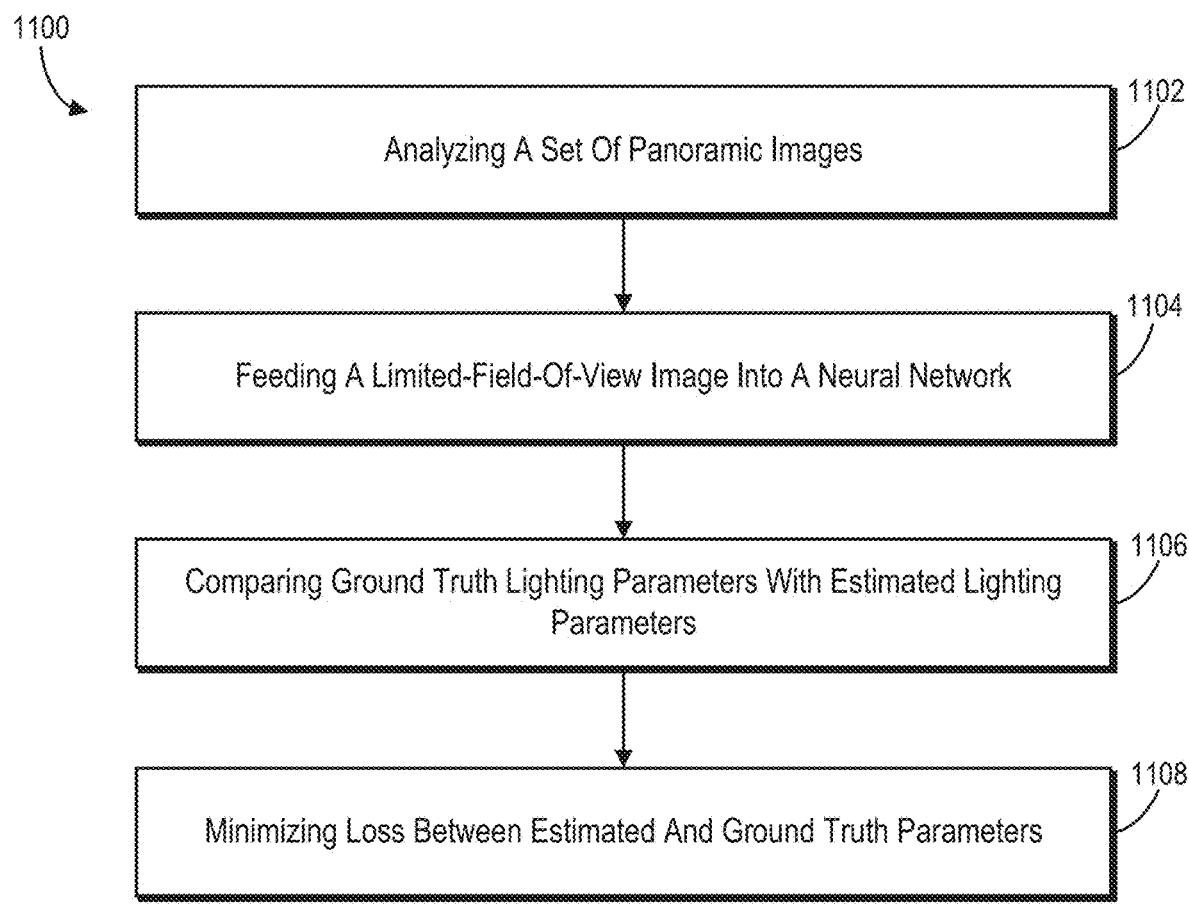
FIG. 11 illustrates a flowchart of a series of acts in a method for training a neural network to extract lighting conditions from a single digital image in accordance with one or more embodiments.

FIG. 11 illustrates a flowchart of a series of acts in a method 1100 of training a neural network to output lighting parameters from a single input image. In one or more embodiments, the method 1100 is performed in a digital medium environment for performing one or more of training a CNN to learn to extrapolate HDR lighting conditions or estimating HDR lighting conditions from a single LDR input image (e.g., performed by software running on one or more computing devices). The method 1100 is intended to be illustrative of one or more methods in accordance with the present disclosure, and is not intended to limit potential embodiments. Alternative embodiments can include additional, fewer, or different steps than those articulated herein with respect to FIG. 11.

The method 1100 describes a method for training a neural network to output lighting parameters from a single image input by performing a number of acts. For example, the neural network can include a first head for estimating the sun position and a second head for estimating the sky parameters. The method 1100 of FIG. 11 can include an act 1102 of analyzing a set of panoramic images. In particular, the act 1102 can involve analyzing the set of panoramic images to determine a plurality of ground truth image lighting parameters. For example, the panoramic images can include low-dynamic range images. The panoramic images can additionally or alternatively include spherical 360-degree images. The act 1102 can further involve determining a sun position and sky parameters, the sky parameters comprising an exposure and a ground truth turbidity. The act 1102 can still further involve applying a sky model algorithm to determine the ground truth lighting parameters.

In addition, the method 1100 can involve iteratively performing a number of acts to train a neural network, each act may be performed once or more than once. For example, the method 1100 can include an act 1104 of feeding a limited-field-of-view portion into a neural network. In particular, the act 1104 can involve feeding, into the neural network, a limited-field-of-view portion of a panoramic image to determine a plurality of estimated lighting parameters, each limited-field-of-view portion comprising a subportion of one of the panoramic images. Additionally, the act 1104 can further involve feeding multiple limited-field-of-view portions of each panoramic image into the neural network. The act 1104 can still further involve determining a sun position and sky parameters, the sky parameters comprising an exposure and a ground truth turbidity.

The method 1100 can including iteratively performing an act 1106 of comparing ground truth lighting parameters with estimated lighting parameters. In particular, the act 1106 can involve comparing, for each panoramic image, the ground truth lighting parameters with the estimated lighting parameters of the corresponding limited-field-of-view portion.

As illustrated in FIG. 11, the method 1100 can further include iteratively performing an act 1108 of minimizing loss between estimated and ground truth parameters. In particular, the act 1108 can involve minimizing a loss between the estimated lighting parameters and the ground truth lighting parameters by implementing an error-reducing technique as described above. The act 1108 can also involve determining a summed loss by adding a sun position loss and a sky parameters loss and minimizing the summed loss via stochastic gradient descent.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
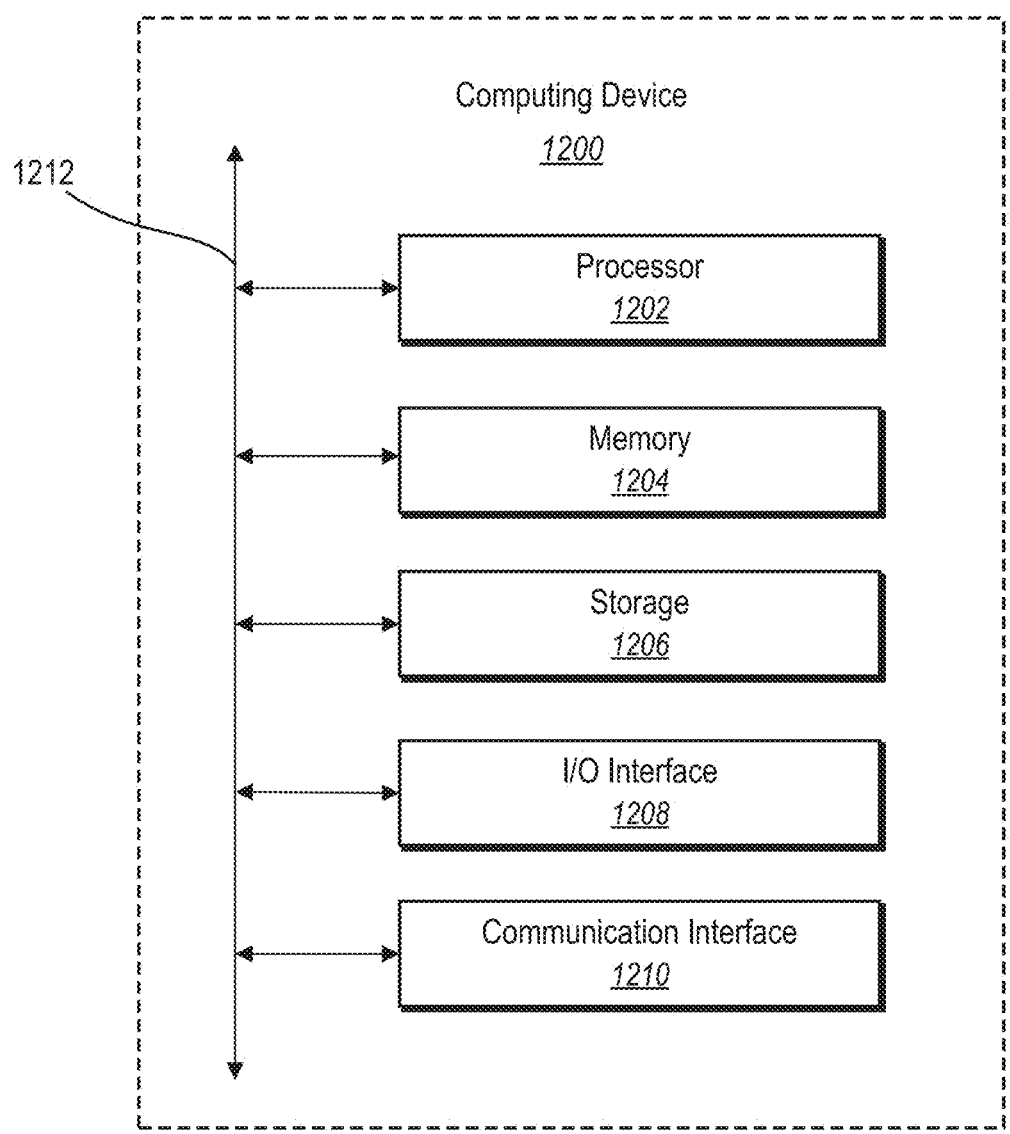
FIG. 12 illustrates a block diagram of an example computing device in accordance with one or more embodiments.

FIG. 12 illustrates, in block diagram form, an exemplary computing device 1200 that may be configured to perform one or more of the processes described above. One will appreciate that the lighting predictor system 800 can comprise implementations of the computing device 1200. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a stylus or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for analyzing and editing digital images, a computer-implemented method of estimating illumination from digital images, the computer-implemented method comprising:

estimating a set of lighting parameters from a single low-dynamic range digital image by feeding the single low-dynamic range digital image into a neural network trained using a plurality of pairs of panoramic images and limited-field-of-view images to output lighting parameters from a single input image;

generating, based on the set of lighting parameters, high-dynamic range lighting conditions for the single low-dynamic range digital image; and generating a modified digital image from the single low-dynamic range digital image using the generated high-dynamic range lighting conditions.

2. The computer-implemented method as recited in claim 1, wherein estimating the set of lighting parameters from the single low-dynamic range digital image comprises estimating a sun position for the single low-dynamic range digital image.

3. The computer-implemented method as recited in claim 2, wherein estimating the sun position for the single low-dynamic range digital image comprises generating a probability distribution over likely sun positions.

4. The computer-implemented method as recited in claim 2, wherein the single low-dynamic range digital image is devoid of a captured sun.

5. The computer-implemented method as recited in claim 2, wherein estimating the set of lighting parameters from the single low-dynamic range digital image comprises estimating an atmospheric turbidity and an exposure.

6. The computer-implemented method as recited in claim 1, further comprising:
estimating, using the neural network and from the single low-dynamic range digital image, one or more camera parameters associated with an image capturing device used to capture the single low-dynamic range digital image;
calibrating a virtual camera with the estimated one or more camera parameters; and
inserting an object into the modified digital image using the calibrated virtual camera.

7. The computer-implemented method as recited in claim 1, further comprising training the neural network by:
analyzing a set of low-dynamic range panoramic images to determine a plurality of ground truth lighting parameters;
feeding into the neural network a limited-field-of-view image from each low-dynamic range panoramic image to estimate lighting parameters for the limited-field-of-view image;
comparing, for each low-dynamic range panoramic image, the ground truth lighting parameters with the estimated lighting parameters of the corresponding limited-field-of-view image; and
minimizing a loss between the estimated lighting parameters and the ground truth lighting parameters.

8. The computer-implemented method as recited in claim 1, wherein generating, based on the estimated set of lighting parameters, the high-dynamic range lighting conditions for the single low-dynamic range digital image comprises generating a high-dynamic range outdoor environment map.

9. The computer-implemented method as recited in claim 1, wherein generating the modified digital image from the single low-dynamic range digital image using the generated high dynamic lighting conditions comprises inserting an object into the single low-dynamic range digital image, the object being illuminated according to the generated high-dynamic range lighting conditions.

10. A system for estimating illumination from digital images, comprising:
a memory comprising a set of panoramic images each depicting a view of a sun; and
a computing device comprising instructions thereon that, when executed by at least one processor, cause the computing device to:
train a neural network to output lighting parameters from a single input image by:
analyzing the set of panoramic images to determine a plurality of ground truth image lighting parameters; and
iteratively:
feeding, into the neural network, a limited-field-of-view image from a panoramic image to determine a plurality of estimated lighting parameters, each the limited-field-of-view image comprising a sub-portion of one of the panoramic images;
comparing, for each panoramic image, the ground truth lighting parameters with the estimated lighting parameters of the corresponding the limited-field-of-view image; and
minimizing a loss between the estimated lighting parameters and the ground truth lighting parameters.

11. The system as recited in claim 10, wherein the panoramic images comprise low-dynamic range spherical 360 degree images.

12. The system as recited in claim 10, wherein feeding, into the neural network, the limited-field-of-view image from the panoramic image to determine a plurality of estimated lighting parameters comprises feeding multiple limited view portions of each panoramic image into the neural network.

13. The system as recited in claim 10, wherein analyzing the set of panoramic images to determine the plurality of ground truth image lighting parameters and feeding, into the neural network, the limited-field-of-view image from the panoramic image to determine the plurality of estimated lighting parameters each comprise determining a sun position and sky parameters, the sky parameters comprising an exposure and a ground truth turbidity.

14. The system as recited in claim 13, wherein the neural network comprises a first head for estimating the sun position and a second head for estimating the sky parameters.

15. The system as recited in claim 14, wherein minimizing the loss between the estimated lighting parameters and the ground truth lighting parameters comprises:
determining a summed loss by adding a sun position loss and a sky parameters loss; and
minimizing the summed loss via stochastic gradient descent.

16. The system as recited in claim 10, wherein analyzing the set of panoramic images to determine the plurality of ground truth lighting parameters comprises applying a sky model algorithm to determine the ground truth lighting parameters.

17. The system as recited in claim 10, further comprising instructions that, when executed by the at least one processor, cause the computing device to:
extract a feature representation that captures illumination information of the single input image from a layer of the neural network; and
use the feature representation to analyze, categorize, or search additional digital images by comparing the feature representation to feature representations of the additional digital images.

18. In a digital medium environment for analyzing and editing digital images, a computer-implemented method of estimating illumination from digital images, the computer-implemented method comprising:
receiving a single low-dynamic range digital image;
receiving a request to modify the single low-dynamic range digital image;

a step for generating high-dynamic range lighting conditions from the single low-dynamic range digital image; and generating a modified digital image from the single low-dynamic range digital image using the high-dynamic range lighting conditions.

19. The computer-implemented method as recited in claim 18, wherein the step for determining high-dynamic range lighting conditions from the single low-dynamic range digital image comprises estimating a set of camera parameters associated with an image capturing device used to capture the single low-dynamic range digital image.

20. The computer-implemented method as recited in claim 18, wherein the step for generating determining high-dynamic range lighting conditions from the single low-dynamic range digital image comprises training a neutral network to estimate high-dynamic range lighting conditions from low-dynamic range digital images.

* * * * *